United States Patent
Kumagai et al.

(10) Patent No.: US 11,531,037 B2
(45) Date of Patent: Dec. 20, 2022

(54) DISPLAY DEVICE, SAMPLE MEASUREMENT SYSTEM, DISPLAY METHOD AND PROGRAM

(71) Applicant: SYSMEX CORPORATION, Kobe (JP)

(72) Inventors: Atsushi Kumagai, Kobe (JP); Yuji Wakamiya, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 100 days.

(21) Appl. No.: 16/911,648

(22) Filed: Jun. 25, 2020

(65) Prior Publication Data
US 2020/0408792 A1    Dec. 31, 2020

(30) Foreign Application Priority Data
Jun. 25, 2019   (JP) .............................. JP2019-117813

(51) Int. Cl.
*G01N 35/00*   (2006.01)
*G01N 35/04*   (2006.01)
(Continued)

(52) U.S. Cl.
CPC ....... *G01N 35/00722* (2013.01); *G01N 35/04* (2013.01); *G06F 3/0482* (2013.01);
(Continued)

(58) Field of Classification Search
CPC .............................................. G01N 35/00722
See application file for complete search history.

(56) References Cited

U.S. PATENT DOCUMENTS

| 2010/0223556 A1* | 9/2010 | Wakabayashi ... G01N 35/00871 715/822 |
| 2010/0271479 A1* | 10/2010 | Heydlauf ................. H04N 7/18 715/830 |
| 2012/0109529 A1* | 5/2012 | Ariyoshi .......... G01N 35/00722 702/19 |

FOREIGN PATENT DOCUMENTS

| EP | 2447702 A2 | 5/2012 |
| EP | 2447702 A3 | 8/2015 |

(Continued)

OTHER PUBLICATIONS

The extended European search report dated Nov. 17, 2020 in a counterpart European patent application No. 20181931.5.
(Continued)

*Primary Examiner* — Roland J Casillas
(74) *Attorney, Agent, or Firm* — Crowell & Moring LLP

(57) ABSTRACT

The present invention facilitates comprehension of the actual positions of constituent units of a sample measurement system regardless of a direction in which a user faces. The present invention provides a display device (6, 60) for displaying information about a sample measurement system (1) for measuring a sample, a display unit (509), a display control unit (101) that displays an image indicating an arrangement of a predetermined part of the sample measurement system on the display unit, and a receiving unit (102, 105) for receiving information on a display direction when displaying the arrangement of the predetermined part, wherein the display control unit (101) changes a display direction of the arrangement of the predetermined part according to the information. According to this aspect, the invention provides a display device (6, 60) for changing a display direction when displaying an arrangement of a predetermined part in the sample measurement system in
(Continued)

accordance with a display direction in the received information.

20 Claims, 20 Drawing Sheets

(51) Int. Cl.
  *G06F 3/04817*    (2022.01)
  *G06F 3/0482*    (2013.01)
  *G06F 3/04847*    (2022.01)
  *G06F 3/14*    (2006.01)

(52) U.S. Cl.
  CPC ...... *G06F 3/04817* (2013.01); *G06F 3/04847* (2013.01); *G06F 3/1423* (2013.01); *G01N 2035/00891* (2013.01); *G01N 2035/0412* (2013.01)

(56) References Cited

FOREIGN PATENT DOCUMENTS

| | | |
|---|---|---|
| JP | 2009-036513 A | 2/2009 |
| WO | 2009/085534 A1 | 7/2009 |

OTHER PUBLICATIONS

The Communication pursuant to Article 94(3) EPC dated Oct. 14, 2022 in a counterpart European patent application No. 20181931.5.

* cited by examiner

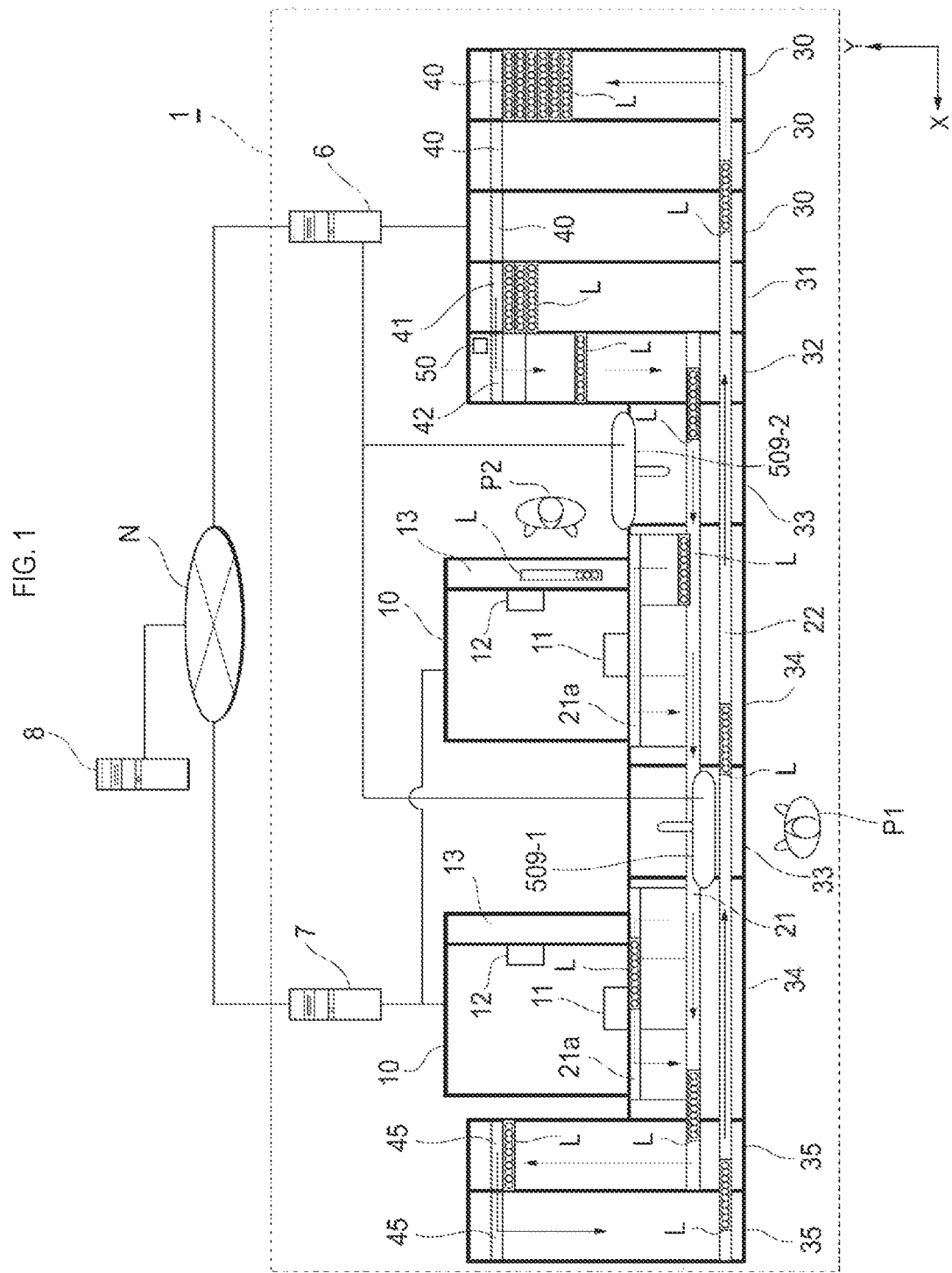

FIG. 15

| Pos. | Sample number | Content | Pick up |
|---|---|---|---|
| 1 | 0000000000000011 | Unclear | ☐ |
| 2 | ERR0000000000002 | Sample number reading error | ☐ |
| 3 | ERR0000000000003 | Sample number reading error | ☐ |
| 4 | 0000000000000014 | No re-examination order | ☐ |
| 5 | 0005 | Quality control sample | ☐ |
| 6 | 0000000000000016 | Querying host... | ☐ |
| 7 | 0000000000000017 | Re-examination order exists | ☐ |
| 8 | 0000000000000018 0000000000ABCDE | Positive ID error | ☐ |
| 9 | 0000000000000019 | Timed out receiving measurement result | ☐ |
| 10 | 0000000000000020 | Re-examination order exists | ☐ |

Rack ID: 001
Storage unit: 1
Storage date/time: aaa

[Pick up rack] [Pick up Sample] [Close]

DISPLAY DEVICE, SAMPLE MEASUREMENT SYSTEM, DISPLAY METHOD AND PROGRAM

RELATED APPLICATIONS

This application claims priority to Japanese Patent Application No. 2019-117813, filed on Jun. 25, 2019, the entire content of which is incorporated herein by reference.

BACKGROUND OF THE INVENTION

1. Field of the Invention

The present invention relates to a display device, a sample measurement system, a display method, and a program.

2. Description of the Related Art

A display device that displays the layout of structural units of a sample measurement system is known. For example, US Patent Application Publication No. 2010/0223556 discloses a display device that displays a layout diagram showing the layout of a plurality of analyzers in an examination room. The display device is connected to a plurality of analyzers via a network, receives an operation status notification from each analyzer, and displays the operation status of each analyzer on a layout diagram based on the notification.

SUMMARY OF THE INVENTION

The display device described in US Patent Application Publication No. 2010/0223556 displays only an image of each analyzer viewed from one direction. However, as the user moves around in the examination room, he sees each analyzer from different directions. Therefore, the arrangement of the analyzers when the user actually looks at the analyzers does not always match the arrangement of the analyzers on the layout diagram displayed on the display device. In that case, it is not easy for the user to grasp the actual position of the analyzer.

Therefore the present invention facilitates comprehension of the actual positions of the constituent units of the sample measurement system regardless of the direction in which the user is facing.

A display device (6, 60) of an aspect of the present invention shown in FIG. 5 is a display device (6, 60) for displaying information about a sample measurement system (1) for measuring a sample, and includes a display unit (509), a display control unit (101) that causes the display unit to display an image indicating an arrangement of a predetermined elements within the sample measurement system on the display unit, and a receiving unit (102, 105) for receiving information on a display direction, wherein the display control unit (101) changes a display direction of the arrangement of the predetermined elements according to the information. According to this aspect, it is possible to change a display direction when displaying an arrangement of a predetermined elements within in the sample measurement system in accordance with a display direction in the received information. In this way the display device can change the display direction of the arrangement to be displayed according to the mode of use when displaying the arrangement of the display target.

As shown in FIGS. 1 and 5, a sample measurement system according to another aspect of the present invention is a sample measurement system (1), which includes a sample processing apparatus (10) for processing a sample, and includes a plurality of units (30, 31, 32, 33, 34, 35) for loading, transporting, and collecting racks capable of holding a plurality of sample containers, a transport device for transporting a sample container to the sample processing device, and a computer (6, 60) connected to the transport device via a communication network and having a display unit (509) and an input unit; the computer includes a display control unit (101) for causing the display unit to display an image indicating an arrangement of a predetermined elements including at least one of the arrangement of the plurality of units, the arrangement of the plurality of racks, and the arrangement of the plurality of sample containers in the rack, and a receiving unit (102, 105) that receives information relating to a display direction, wherein the display control unit changes a display direction of the arrangement of the predetermined part according to the information. According to this aspect, it is possible to change a display direction when displaying an arrangement of a predetermined elements in the sample measurement system in accordance with a display direction in the received information. In this way the display device can change the display direction of the arrangement to be displayed according to the mode of use when displaying the arrangement of the display target.

A computer implemented method according to another aspect of the present invention is a computer implemented method for a sample measurement system (1) for measuring a sample, and includes receiving information about a display direction, and displaying an image indicating an arrangement of a predetermined elements within the sample measurement system according to the display direction of the received information. According to this aspect, it is possible to change a display direction when displaying an arrangement of a predetermined elements in the sample measurement system in accordance with a display direction in the received information. In this way the display device can change the display direction of the arrangement to be displayed according to the mode of use when displaying the arrangement of the display target.

According to the present invention, it is possible to easily comprehend the actual positions of the constituent units of the sample measurement system regardless of the direction in which the user is facing.

BRIEF DESCRIPTION OF THE DRAWINGS

FIG. 1 is a plan view showing a structural example of a sample measurement system according to an embodiment;

FIG. 15 is a diagram showing an example of a sample detail screen;

DETAILED DESCRIPTION OF THE PREFERRED EMBODIMENTS

Figure 2A:
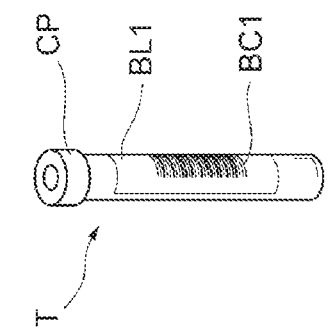
FIGS. 2A and 2B are diagrams showing structural examples of a sample container and a sample rack.

An embodiment of the present invention will be described with reference to the accompanying drawings. Note that components denoted by the same reference numerals have the same or similar structures in each of the drawings.

Sample Measurement System Structure

In the present embodiment, a sample measurement system for measuring a predetermined component amount, a property, and the like of a sample collected from a subject will be described.

The structure of the sample measurement system 1 will be described with reference to FIG. 1. The sample measurement system 1 includes a measurement unit 10, a storage unit 30, a loading unit 31, a barcode reading unit 32, a transport unit 33, a transport unit 34, a retest standby unit 35, a transport controller 6, and an information processing unit 7. The sample measurement system 1 is installed in a hospital and connected to a host computer 8 that manages various test results. The transport controller 6, the information processing unit 7, and the host computer 8 are connected via a communication network N, through which the units can communicate with each other.

The loading unit 31 is a unit into which is loaded a rack L (hereinafter, referred to as "sample rack L") capable of holding a plurality of sample containers. The loading unit 31 is provided with a transport path 41 for discharging the sample rack L in a left direction (X-axis positive direction), and the loaded sample rack L is transported to the barcode reading unit 32 through the transport path 41. Note that the sample rack L also may be referred to as a "rack".

The storage unit 30 is a unit that collects the sample rack L for which measurement has been completed by the measurement unit 10. The accommodated sample racks L are arranged in order from the transport path 40 side of the storage unit 30 and are taken out of the storage unit 30 by the user. The storage unit 30 also may be referred to as a "collection unit" because the storage unit 30 collects a sample for which measurement has been completed. The storage unit 30 and the loading unit 31 have the same hardware structure, and may be configured to switch between operation as the storage unit 30 and operation as the loading unit 31 via settings.

The barcode reading unit 32 is connected to the input unit 31 and the transport unit 33. The barcode reading unit 32 includes a transport path 42 for transporting the sample rack L to the left (X-axis positive direction). The barcode reading unit 32 receives the sample rack L before measurement from the transport path 41 of the input unit 31, reads the barcode of the received sample rack L and the barcode of the sample container held in the sample rack L, and the sample rack L then is output to the transport path 21.

The transport unit 33 and the transport unit 34 are installed between the barcode reading unit 32 and the retest standby unit 35, and transport the sample rack L. The transport unit 34 transports the sample rack L to be measured by the measurement unit 10 to the measurement unit 10.

The storage unit 30, the input unit 31, the barcode reading unit 32, the transport unit 33, the transport unit 34, and the retest standby unit 35 are arranged side by side on a horizontal floor in the facility of the user. The two elongated transport paths 21 and the transport path 22 are formed by connecting the storage unit 30, the input unit 31, the barcode reading unit 32, the transport unit 33, the transport unit 34, and the retest standby unit 35 side by side.

In the following description, the path from the loading unit 31 to the retest standby unit 35 through the transport path 21 is referred to as a "feed path". The path from the retest standby unit 35 to the storage unit 30 through the transport path 22 is referred to as a "return path".

The measurement unit 10 is a blood coagulation measurement unit for performing a measurement related to blood coagulation by analyzing the transmitted light or scattered light obtained by irradiating the measurement sample with light by a coagulation method, a synthetic substrate method, an immunoturbidity method, or an agglutination method, thereby analyzing the coagulation ability of blood. The measurement unit 10 includes a suction unit for suctioning a sample. The measurement unit 10 measures the sample by mixing the suctioned sample with a reagent to prepare a measurement sample, and optically measuring the measurement sample.

The measurement unit 10 includes a suction unit 11 and a suction unit 12 for suctioning a sample at two locations at the left side and the front of the measurement unit 10. The suction unit 11 provided at the left side is used for suctioning a sample to be measured from a sample container stored in the sample rack L transported by the transport unit 34. The suction unit 12 provided at the front side is provided, for example, on the front side of the user P2 located on the right side of the measurement unit 10. The suction unit 12 is used for directly suctioning the sample stored in the sample container accommodated in the sample rack L set in the urgent sample setting unit 13. When the sample container is set in the emergency sample setting unit 13, the measurement unit 10 suspends the operation of suctioning the sample from the suction unit 11 and preferentially suctions the sample set in the urgent sample setting unit 13.

The measurement unit 10 is not limited to a blood coagulation measurement unit, and may be another measurement unit. For example, the measurement unit 10 also may be a blood cell measurement unit that classifies and counts blood cells contained in a whole blood sample using a flow cytometry method. The measurement unit 10 also may be an immunoassay measurement unit that measures a blood serum sample using a chemiluminescent enzyme immunoassay (CLEIA) for testing for various items such as hepatitis B, hepatitis C, tumor markers, and thyroid hormone. The measurement unit 10 also may be a unit for measuring the amount of particles contained in a urine sample by a flow cytometry method or analysis of a microscopic image. The measurement unit 10 also may be a biochemical measurement unit for measuring a blood serum or urine sample using a colorimetric measurement method for examining measurement items related to sugar, cholesterol, protein, enzyme, and the like.

The number of measurement units 10 is not limited to two. Three or more measurement units 10 of the same type may be installed, or a plurality of types of measurement units may be installed. The number of measurement units 10 also may be one.

The retest standby unit 35 is installed downstream of the feed path. The retest standby unit 35 receives and stores the sample rack L accommodating the measured sample, which has been transported through the transport path 21. The retest standby unit 35 is used to keep the sample rack L on standby until the determination result regarding the necessity of the retest is obtained in the measurement unit 10. The retest standby unit 35 also outputs the sample rack L for which it has been determined that a retest is not necessary for all the samples to the transport path 22.

The retest standby unit 35 does not necessarily have to be installed in the sample measurement system 1. In this case, a unit that receives the sample rack L after measurement from the transport path 21 and outputs it to the transport path 22 can be provided instead of the retest standby unit 35.

The transport controller 6 is a device that controls the transport of the sample rack L. The transport controller 6 controls the transport operation of the sample rack L in the sample measurement 1 by transmitting various commands to the storage unit 30, the input unit 31, the barcode reading unit 32, the transport unit 33, the transport unit 34, and the retest standby unit 35. The storage unit 30, the input unit 31, the barcode reading unit 32, the transport unit 33, the transport unit 34, and the retest standby unit 35 also may be collectively referred to as a "transport unit".

The transport controller 6 also includes a display unit 509-1 and a display unit 509-2. The display unit 509-1 is arranged in a direction in which a display screen can be seen from the front side of the sample measurement system 1 (hereinafter, the side on which the user P1 is standing is referred to as the front side of the sample measurement system 1), and the display unit 509-2 is arranged in a direction in which a display screen can be seen from the rear side of the sample measurement system 1 (hereinafter, the side on which the user P2 stands is referred to as the rear side of the sample measurement system 1). In this way the user can easily browse the display on the display unit regardless of whether the user is at the front side or the rear side of the sample measurement system 1. Hereinafter, when the display unit 509-1 and the display unit 509-2 are not distinguished, the term "display unit 509" is described. The display unit 509 is a device for displaying an operational state of the transport unit, information on the sample rack L stored in the storage unit 30, as well as each sample in the sample rack L. The sample measurement system 1 includes two display units 509. The display unit 509-1 located at front side of the user P1 is used by the user P1 to comprehend the operational state and the like of the transport unit, and the display unit 509-2 located on the left side is used by the user P2 to comprehend the operational state and the like of the transport unit. There is no limit on the number of display units 509 that can be connected to the transport controller 6. The number of the display unit 509 also may be one.

The information processing unit 7 is communicably connected to the two measurement units 10 and controls the operation of the two measurement units 10. The information processing unit 7 is communicably connected to the transport unit 34 and controls a transport operation by the transport unit 34. When the sample ID is read by the bar code unit in the measurement unit 10, the information processing unit 7 queries the host computer 8 regarding the measurement order. The information processing unit 7 performs an analysis based on the measurement result performed by the measurement unit 10, and transmits the analysis result to the host computer 8. The measurement order means a measurement item registered in advance in association with the sample ID.

Figure 2B:
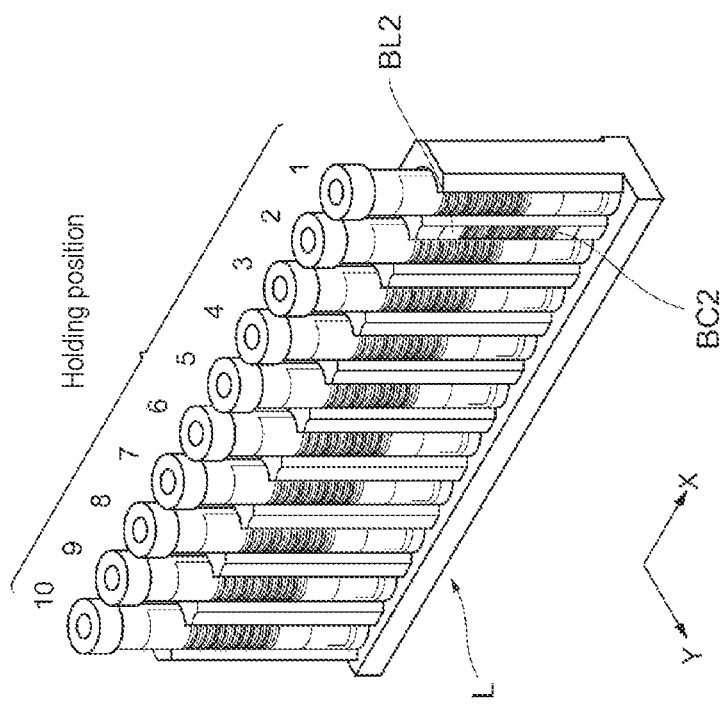

FIGS. 2A and 2B are diagrams showing the configuration of the sample container T and the sample rack L. FIG. 2A is a perspective view showing an appearance of a sample container T, and FIG. 2B is a perspective view showing an appearance of a sample rack L holding ten sample containers T.

The sample container T shown in FIG. 2A is a tubular container made of a light-transmitting glass or a synthetic resin, and is sealed by a lid CP. A blood sample collected from a patient is stored inside the sample container T. A barcode label BL1 is attached to a side surface of the sample container T. A barcode BC1 indicating the sample ID is printed on the barcode label BL1.

In the sample rack L shown in FIG. 2B, ten holding units are formed so that ten sample containers T can be held side by side in a vertical state (standing state). Numbers 1 to 10 indicating the holding positions are assigned to the ten holding units as identifiers indicating the positions where the sample containers are held (stored) in the sample rack L. In the present embodiment, numbers from 1 to 10 are sequentially assigned in the X-axis negative direction. A barcode label BL2 is attached to a side surface of the sample rack L. A barcode BC2 indicating a rack ID is printed on the barcode label BL2.

The structure of the storage unit 30 will be described in more detail with reference to FIG. 3. A transport path 40 is provided at one end of the installation unit 310 (the rear side of the sample measurement system 1), and a loading unit 330 is provided at the other end of the installation unit 310 (the front side of the sample measurement system 1). The loading unit 330 is a part of the transport path 22. The installation unit 310 is provided with a transfer unit 340 for transferring the sample rack L from the loading unit 330 toward the transport path 40 (Y-axis positive direction). The transfer unit 340 is a claw-shaped member that can protrude from both sides of the installation unit 310, and moves in the Y-axis positive direction while protruding. The transfer unit 340 transfers the sample rack L in the Y-axis positive direction by engaging with the sample rack L from both sides and moving in the Y-axis positive direction.

Sample Measurement System 1 Operation Summary

The description continues, returning to FIG. 1. The loading unit 31 accommodates the sample rack L loaded by the user, and outputs the accommodated sample rack L to the barcode reading unit 32 via the transport path 41 and the transport path 42.

The barcode reading unit 32 receives the sample rack L output by the input unit 31. The barcode reading unit 32 reads the rack ID of the received sample rack L and the sample ID of the sample container T associated with the holding position of the sample rack L by the barcode unit 50. Subsequently, the barcode reading unit 32 transmits the rack ID and the sample ID read by the barcode unit to the transport controller 6 and outputs the sample rack L to the transport path 21.

The transport unit 33 receives the sample rack L transported to the transport path 21 by the barcode reading unit 32, and transports the sample rack L to the transport unit 34. The transport unit 34 has two set transport lines, that is, the transport unit 34 is divided into a line where the sample rack L is transported to the measurement unit 10 and a case where the sample rack L is transported to the adjacent transport unit 33 without transporting the sample rack L to the measurement unit 10. That is, when a measurement is performed by the measurement unit 10, the sample rack L is transported along a transport path 21a which branches from the transport path 21 and returns to the transport path 21 via a position accessible by the suction unit 11 of the measurement unit 10. When transporting to the adjacent transport unit 33 without performing measurement in the measurement unit 10, the sample rack L is transported along the transport path 21 so as to skip the measurement unit 10.

The sample measurement system 1 is provided with two measurement units 10, and the transport controller 6 controls which of the measurement units 10 will measure the sample rack L. For example, the transport controller 6 queries about the measurement order by transmitting the rack ID and the sample ID read by the barcode reading unit 32 to the host computer 8, and sends the sample rack L to the measurement unit 10 which is capable of executing the queried measurement order.

The sample rack L from which the sample has been suctioned by the measurement unit 10 is sent to the retest standby unit 35 through the transport path 21. Subsequently, the retest standby unit 35 outputs the sample rack L, for which it is determined that retesting is not necessary for all samples accommodated therein, to the transport path 22. On the other hand, the sample rack L for which re-testing is determined to be necessary remains in the retest standby unit 35 without being sent to the transport path 22.

Screens Displayed on Display Unit 509

In the sample measurement system 1, the display unit 509 can be installed in various directions according to the position at which the user performs the work. For example, the display unit 509-1 is used by the user P1 who views the sample measurement system 1 in the Y-axis positive direction, and the display unit 509-2 is used by the user P2 who views in the Y-axis negative direction, which is a direction opposite to the direction in which the user P1 views the display unit 509-1.

Here, in the sample measurement system 1, there exists a part where the arrangement looks different depending on the direction in which the sample measurement system 1 is viewed, such as the arrangement pattern of each unit and the order of the holding units 1 to 10 provided in the sample rack L. For example, when a user views the sample measurement system 1 in the Y-axis positive direction in FIG. 1 (that is, when the sample measurement system 1 is viewed from the front side), the three storage units 30 appear arranged side by side in order from the right side. On the other hand, when a user looks at the sample measurement system 1 in the Y-axis negative direction in FIG. 1 (that is, when the sample measurement system 1 is viewed from the rear side), the three storage units 30 appear arranged in order from the left side.

Therefore, when the user P1 refers to the screen displayed on the display unit 509-1, the arrangement and the like of each unit are displayed in the same order as when the sample measurement system 1 is viewed from the front side. Similarly, when the user P2 refers to the screen displayed on the display unit 509-2, the arrangement and the like of each unit are displayed in the same order as when the sample measurement system 1 is viewed from the rear side.

Therefore, when displaying an image indicating the arrangement of a predetermined portion of the sample measurement system 1, the transport controller 6 has the functions of receiving from the user an instruction regarding a display direction when displaying the arrangement of the predetermined part, and displaying an image in which the arrangement of the predetermined part is changed according to the display direction specified by the user. The arrangement of the predetermined part may include, for example, at least one of an arrangement of a plurality of units, an arrangement of a plurality of sample racks in a unit, an arrangement of a plurality of sample containers in a sample rack, and the like. Note that the transport controller 6 also may be referred to as a "display device" inasmuch as the transport controller 6 controls and displays the content displayed on the display unit 509.

The display unit 509 also displays a screen that displays the measurement result of the sample measured by the measurement unit 10.

Hardware Structure

Figure 4:
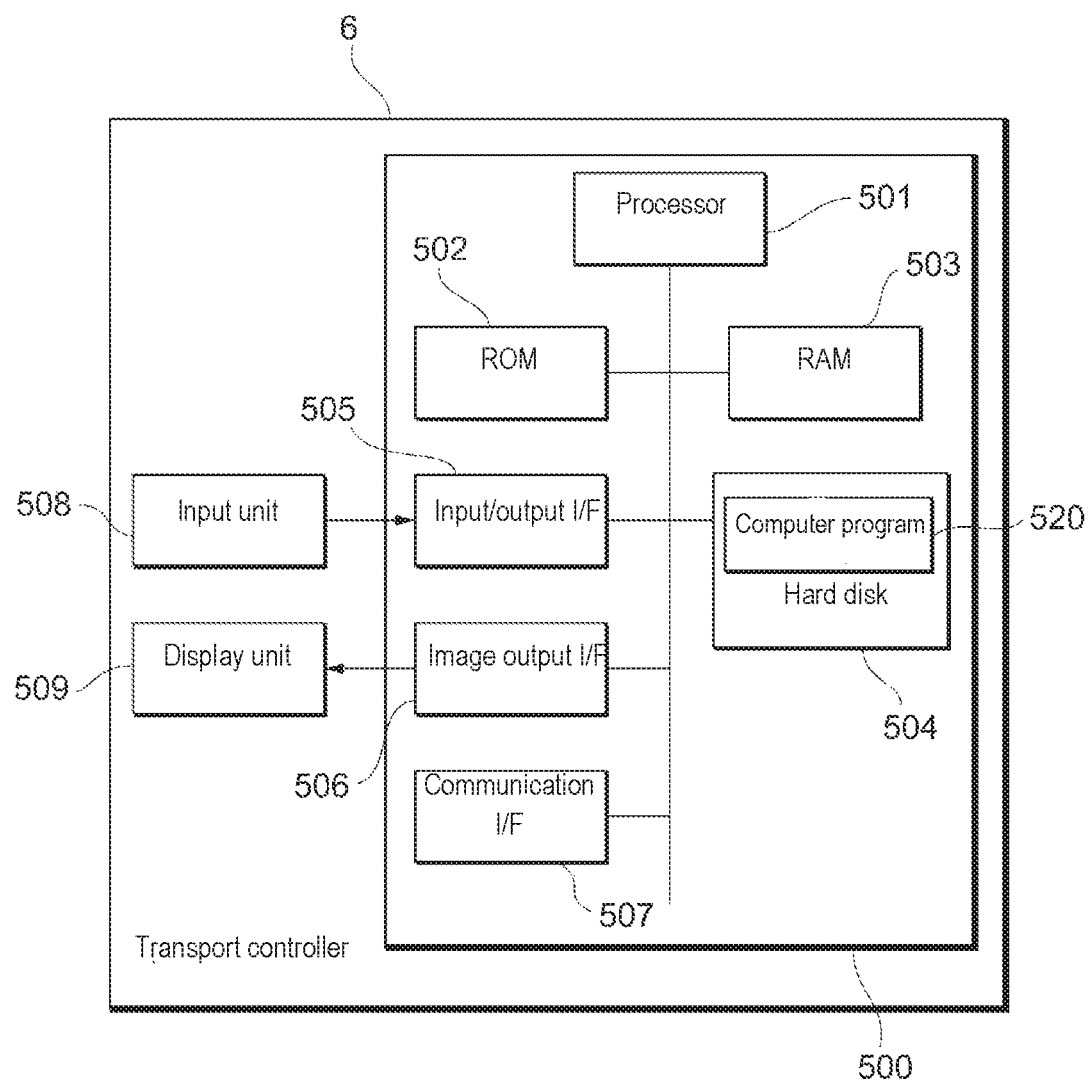
FIG. 4 is a diagram showing a structural example of hardware of a transport controller.

The transport controller 6 is configured by a computer. The structure of the transport controller 6 will be described with reference to FIG. 4. The transport controller 6 includes a control unit 500, an input unit 508, and a display unit 509. The control unit 500 includes a processor 501, a ROM 502, a RAM 503, a hard disk 504 as a storage unit, an input/output interface 505, an image output interface 506, and a communication interface 507.

The processor 501 executes a program stored in the ROM 502 and a program loaded in the RAM 503. The RAM 503 is used for reading a program recorded in the ROM 502 and the hard disk 504. The RAM 503 is also used as a work area of the processor 501 when executing a program. The program can be stored on a storage medium. The storage medium storing the program may be a computer readable non-transitory storage medium. The non-transitory storage medium is not particularly limited, but may be a storage medium such as a USB memory or a CD-ROM The input unit 508 is connected to the input/output interface 505. The input unit 508 is, for example, a keyboard, a touch panel, a mouse, and the like. The display unit 509 is connected to the image output interface 506. The display unit 509 is, for example, a display.

The storage unit 30, the input unit 31, the barcode reading unit 32, the transport unit 33, the transport unit 34, and the retest standby unit 35 are connected to a communication interface 507, and perform data communication with the transport controller 6.

The communication interface 507 is connected to the host computer 8. The host computer 8 has registered the measurement order of the sample, and transmits the measurement order in response to a query from the transport controller 6.

Function Structure

Figure 5:
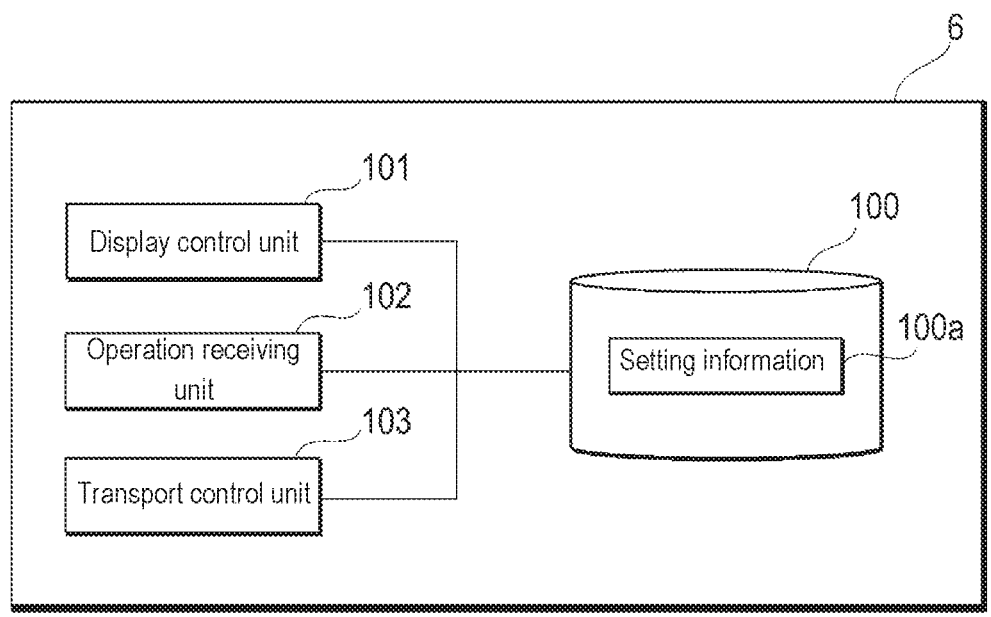
FIG. 5 is a diagram showing a function structural example of a transport controller.

FIG. 5 is a diagram illustrating an example of a function structure of the transport controller 6. The transport controller 6 includes a storage unit 100, a display control unit 101, an operation receiving unit 102, and a transport control unit 103. The storage unit 100 can be realized using the RAM 503 or the hard disk 504. The display control unit 101, the operation receiving unit 102, and the transport control unit 103 can be realized by the processor 501 of the transport controller 6 executing a program stored in the hard disk 504.

The storage unit 100 stores the setting information 100a. The setting information 100a stores, on the display unit 509, a setting value indicating a display direction when displaying an image indicating an arrangement of a predetermined part of the sample measurement system.

The display control unit 101 has a function of displaying an image on the display unit 509 by generating image data of an image to be displayed on the display unit 509, and transmitting the generated image data to the display unit 509. The image displayed on the display unit 509 includes an image indicating an arrangement of a predetermined part in the sample measurement system 1. The display control unit 101 also displays an image in which the display direction of the arrangement of the predetermined part is changed according to an instruction received by the operation receiving unit 102 without changing the arrangement relation of the predetermined part in the sample measurement system 1.

The instruction related to the display direction is associated with the direction in which the user looks at the sample measurement system 1, and the display control unit 101 may display the arrangement of a predetermined part of the sample measurement system 1 so as to be the same as the actual arrangement when the user views the sample measurement system 1.

The display control unit 101 also may display a screen for receiving an instruction regarding the display direction which includes in an image indicating an arrangement of a predetermined part of the sample measurement system 1 or a setting screen.

The operation receiving unit 102 has a function of receiving an instruction regarding a display direction when displaying an arrangement of a predetermined part of the sample measurement system 1. The operation receiving unit 102 stores the setting value corresponding to the received instruction in the setting information 100*a* in association with the display unit 509. For example, an instruction received on the screen of the display unit 509-1 is stored in the setting information 100*a* in association with the display unit 509-1, and an instruction received on the screen of the display unit 509-2 is stored in the setting information 100*a* in association with the display unit 509-2. The operation receiving unit 102 may receive an instruction regarding a display direction by receiving a selection of one instruction item from a plurality of preset instruction items.

The operation receiving unit 102 receives, for each of the display units 509, an instruction regarding a display direction when displaying the arrangement of the predetermined part, and associates a setting value corresponding to the received instruction with the display unit 509 in the setting information 100*a*. In this case, the display control unit 101 may display, for each display unit 509, an image in which the arrangement of the predetermined part has been changed in accordance with the display direction received an instruction from the user.

The transport control unit 103 has a function of transporting the sample rack L to an appropriate position by controlling a transport unit connected to the transport controller 6. The transport control unit 103 determines the measurement unit 10 that executes the measurement order based on the rack ID and the sample ID read by the barcode reading unit 32, and transports the sample rack L to the determined measurement unit 10. The measurement result for each sample is obtained from the information processing unit 7, and when the measurement is completed for all the samples in the sample rack L, the sample rack L is transported to the storage unit 30.

Operational Examples

Figure 6:
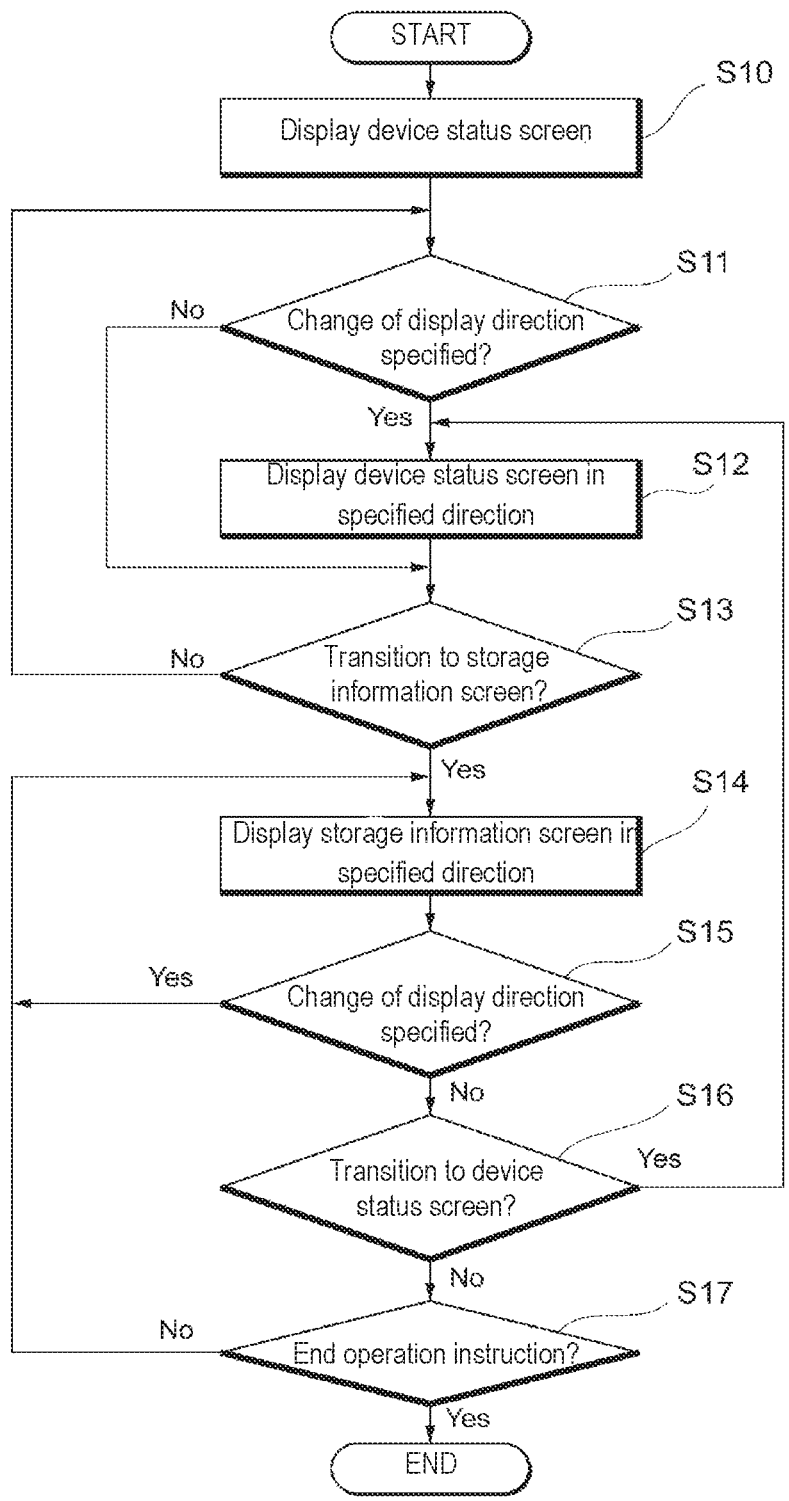
FIG. 6 is a flowchart showing an example of a processing procedure performed by a transport controller.

Next, an operational example when the transport controller 6 controls a screen displayed on the display unit 509 will be described. When the transport controller 6 is activated, the display control unit 101 of the transport controller 6 displays various screens on the display unit 509 according to the processing procedure shown in FIG. 6.

In step S10, the display control unit 101 displays a device status screen. On the device status screen, an image is displayed in which icons indicating each of a plurality of units configuring the sample measurement system 1 are arranged according to the arrangement of the plurality of units.

Figure 7:
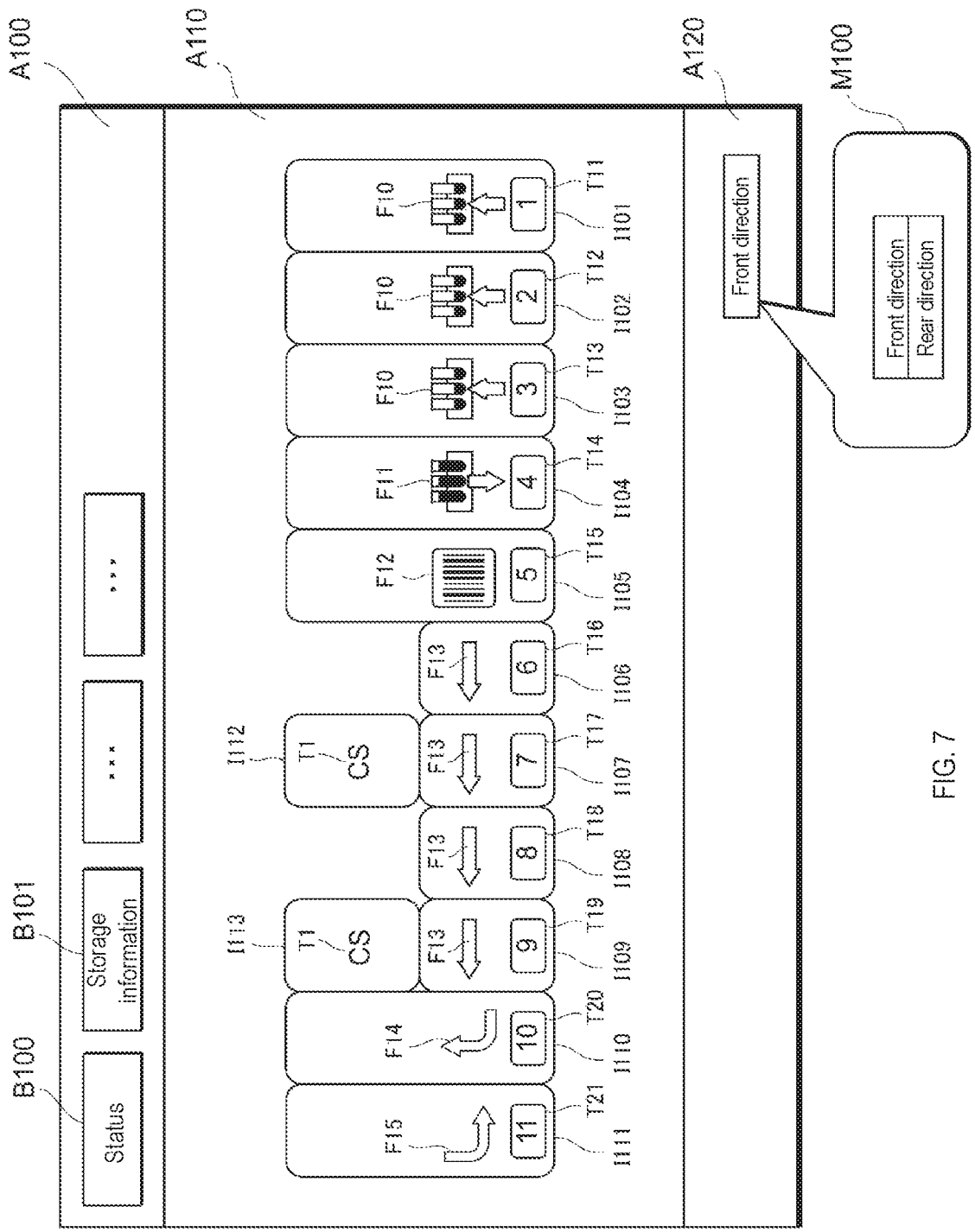
FIG. 7 is a diagram showing an example of an apparatus status screen.

FIG. 7 shows an example of a device status screen. The device status screen includes a display menu selection region A100, a device status display region A110, and a display direction designation region A120.

Icons I101 to I111 indicating the plurality of units, the operating states, functions, and unit numbers of the plurality of units configuring the sample measurement system 1 are shown in the device status display area A110, and icons I101 to I111 indicating each of the plurality of units are arranged and displayed in the order in which the units are arranged in the sample measurement system 1.

The operational state of the unit may be represented by a change in the color of each icon. For example, the status may be changed to gray when the power is off, green when the operation is normal, and red when an error occurs.

At least one of the object displayed in the same direction regardless of the display direction and the object displayed in a direction corresponding to the display direction is drawn on the icon indicating each of the plurality of units. The objects displayed in the same direction regardless of the display direction are, for example, characters (including numbers) indicating the functions or unit numbers of the units, and graphic objects indicating the functions of the units. The object displayed in the direction corresponding to the display direction is a graphic object of an arrow indicating the transport direction of the sample rack.

The unit numbers T11 to T21 are numbers identifying each unit configuring the sample measurement system 1. The unit number may be a number set by an installer or the like when the sample measurement system 1 is installed. The unit number also may be set according to a rule of some type, for example, the unit number may be incremented by one with the leftmost or rightmost unit of the sample measurement system 1 as the first unit. In the present embodiment, the rightmost unit is set to No. 1 when the sample measurement system 1 is viewed from the front side.

The icon I101 corresponds to the storage unit 30 shown at the right end of FIG. 1. On the icon I101, an object F10 indicating the storage unit 30, and a character T11 indicating the first unit are shown. The icons I102 and I103 correspond to the second and third storage units 30, respectively, from the right side in FIG. 1.

Icon 1104 corresponds to input unit 31. On the icon 1104, an object F11 indicating the input unit 31 and a character T14 indicating the fourth unit are shown. The icon 1105 corresponds to the barcode reading unit 32. On the icon 1105, an object F12 indicating the barcode reading unit 32, and a character T15 indicating the fifth unit are shown.

The icon 1106 corresponds to the right transport unit 33 of the two transport units 33 shown in FIG. 1. In the icon 1106, an object F13 indicating the transport direction of the sample rack L, and a character T16 indicating the sixth unit are shown. The icon 1107 corresponds to the right transport unit 34 of the two transport units 34 shown in FIG. 1. On the icon 1107, an object F13 indicating the transport direction of the sample rack L, and a character T17 indicating the seventh unit are shown. The icon 1108 corresponds to the left transport unit 33 of the two transport units 33 shown in FIG. 1. In the icon 1108, an object F13 indicating the transport direction of the sample rack L, and a character T18 indicating the eighth unit are shown. The icon 1109 corresponds to the left transport unit 34 of the two transport units 34 shown in FIG. 1. In the icon 1108, an object F13 indicating the transport direction of the sample rack L, and a character T19 indicating a ninth unit are shown.

The icon I110 corresponds to the retest standby unit 35 on the right side of the two retest standby units 35 shown in FIG. 1. On the icon I110, an object F14 indicating the transport direction of the sample rack L, and a character T20 indicating the tenth unit are shown. The icon I111 corresponds to the retest standby unit 35 on the left side of the two retest standby units 35 shown in FIG. 1. In the icon I111, an object F15 indicating the transport direction of the sample rack L, and a character T21 indicating the eleventh unit are shown.

The icon 1112 corresponds to the right side measurement unit 10 of the two measurement units 10 shown in FIG. 1. In the icon 1112, a character T1 (CS) indicating that the icon is the measurement unit 10 is shown. The icon 1113 corresponds to the left measurement unit 10 of the two measurement units 10 shown in FIG. 1. In the icon 1113, a character T1 (CS) indicating that the icon is the measurement unit 10 is shown.

Note that the icon 1112 may be integrated with the icon 1107 because the transport unit 34 and the measurement unit 10 are installed as a set. That is, on the icon 1107, the object F13 indicating the transport direction of the sample rack L, the character "7" indicating the seventh unit, and the character T1 indicating that the measurement unit 10 is installed also may be shown. Similarly, icon 1113 may be integral with icon 1109.

A pull-down menu M100 for receiving an instruction (information) regarding the display direction of the arrangement of a plurality of units displayed in the device status display area A110 is displayed in the display direction designation area A120. "Forward" is a setting value that is set when the user views the sample measurement system 1 from the front side. In the example of FIG. 1, this corresponds to a case in which the user P1 views the sample measurement system 1 from the front side. "Rearward" is a setting value that is set when the user views the sample measurement system 1 from the rear side. In the example of FIG. 1, this corresponds to the case in which the user P2 views the sample measurement system 1 from the rear side. Note that "forward" may be the default value as the instruction regarding display direction.

The description will continue returning to FIG. 6.

In step S11, the operation receiving unit 102 determines whether an instruction to change the display direction has been received by operating the menu M100. When an instruction for a direction change is received, the process proceeds to step S12, and when no instruction is received, the process proceeds to step S13.

In step S12, the display control unit 101 displays, in the device status display area A110, an image obtained by rearranging the icons indicating the plurality of units in the display direction specified by the user.

Figure 8:
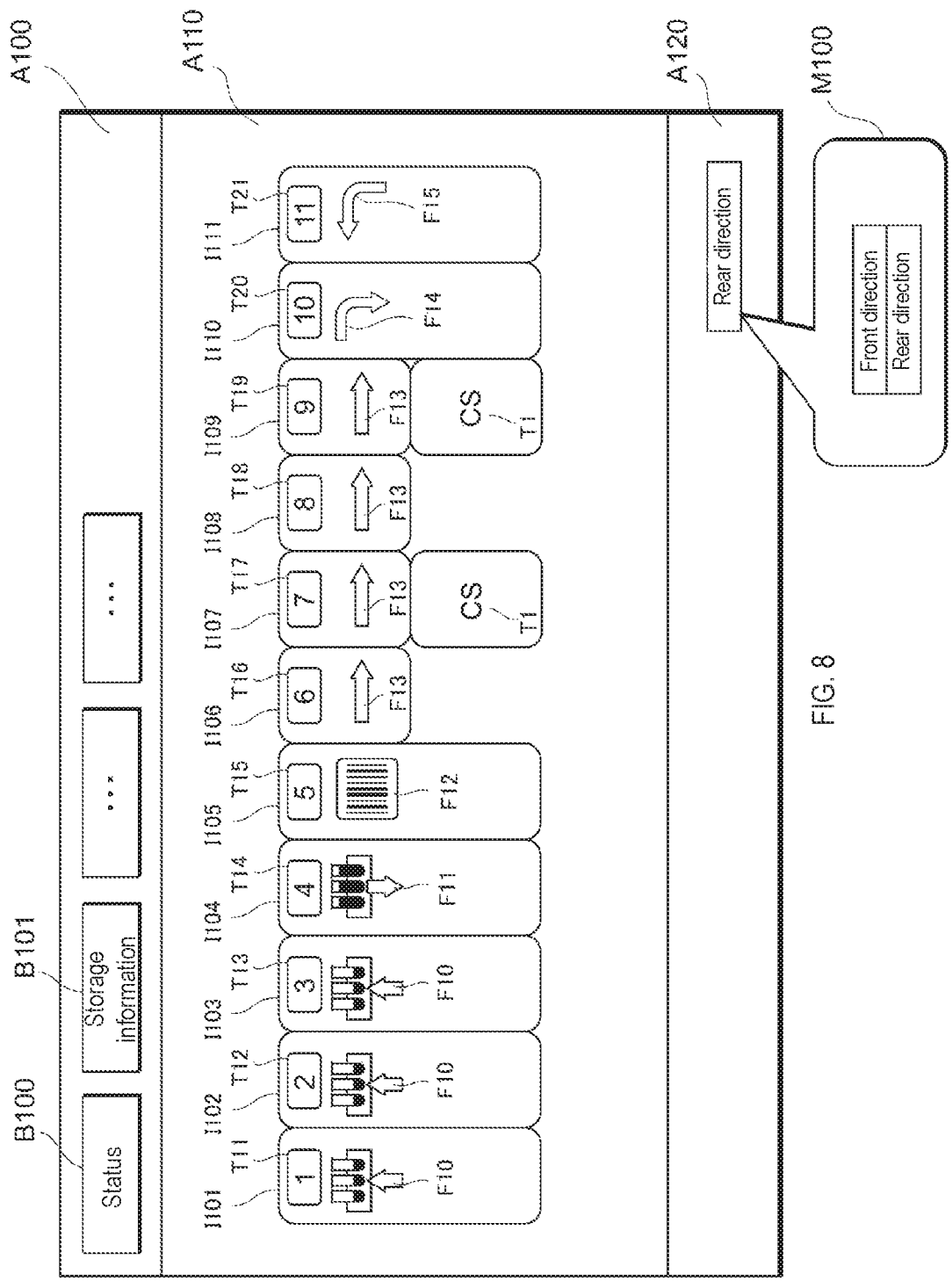
FIG. 8 is a diagram showing an example of an apparatus status screen.

FIG. 8 shows a display example in a case where the user designates "backward" in the display direction designation area A120. In the device status display area A110 shown in FIG. 8, icons indicating each of the plurality of units configuring the sample measurement system 1 are arranged and displayed in the same order as the arrangement of the units when the sample measurement system 1 is actually viewed from the back.

Regarding objects displayed in the direction corresponding to the display direction (arrow figures indicating the transport direction of the sample rack L) among the objects shown on each icon, the display control unit 101 performs display in a state in which the display control unit 101 is rotated in a direction corresponding to the designated display direction. On the other hand, objects (graphic objects and characters indicating functions) displayed in the same direction regardless of the display direction are displayed in a fixed direction regardless of the designated display direction.

In the example of FIG. 8, the unit numbers (T11 to T21), which are objects displayed in the same direction regardless of the display direction, and the graphics (F10 to F12) indicating functions are displayed in the same orientation in FIGS. 7 and 8. However, regarding arrow figures (F13 to F15) indicating the transport direction of the sample rack L, which are graphic objects displayed in a state rotated in a direction corresponding to the designated display direction, when the sample measurement system 1 is viewed from the rear, the sample rack L is displayed in a state of being rotated in a direction indicating the same transport direction as the transport direction of the sample rack L. In this way the object indicating the function of the character or the unit is displayed without impairing the visibility of the user, and the transport direction of the rack is displayed in the correct direction according to the display direction of the arrangement, so that the user can more accurately and quickly ascertain the state of each unit.

Figure 9A:
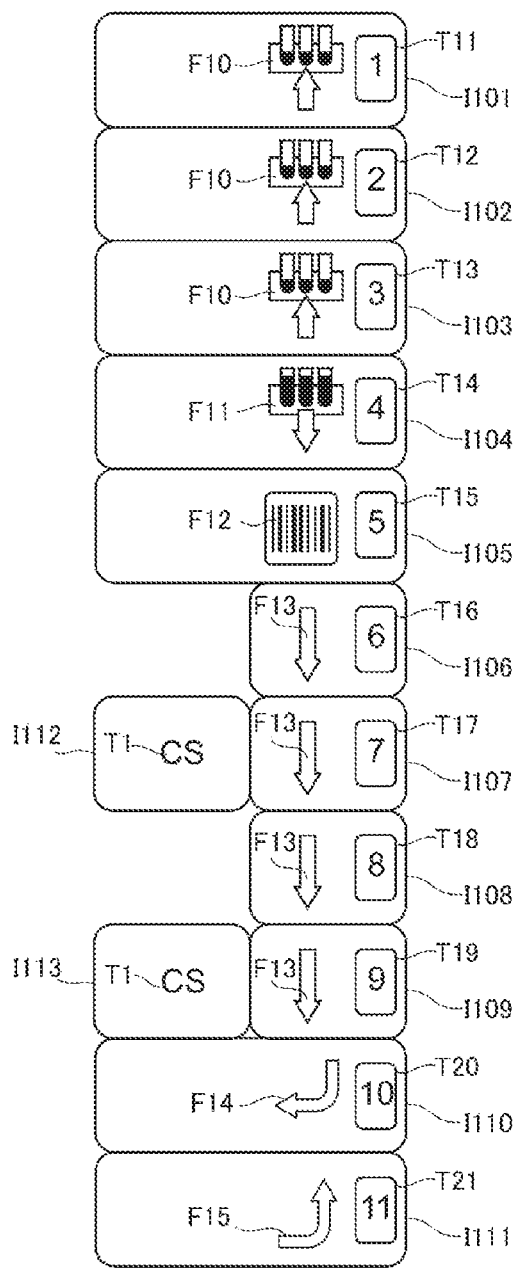
FIGS. 9A and 9B are diagrams showing examples of a device status display.
Figure 9B:
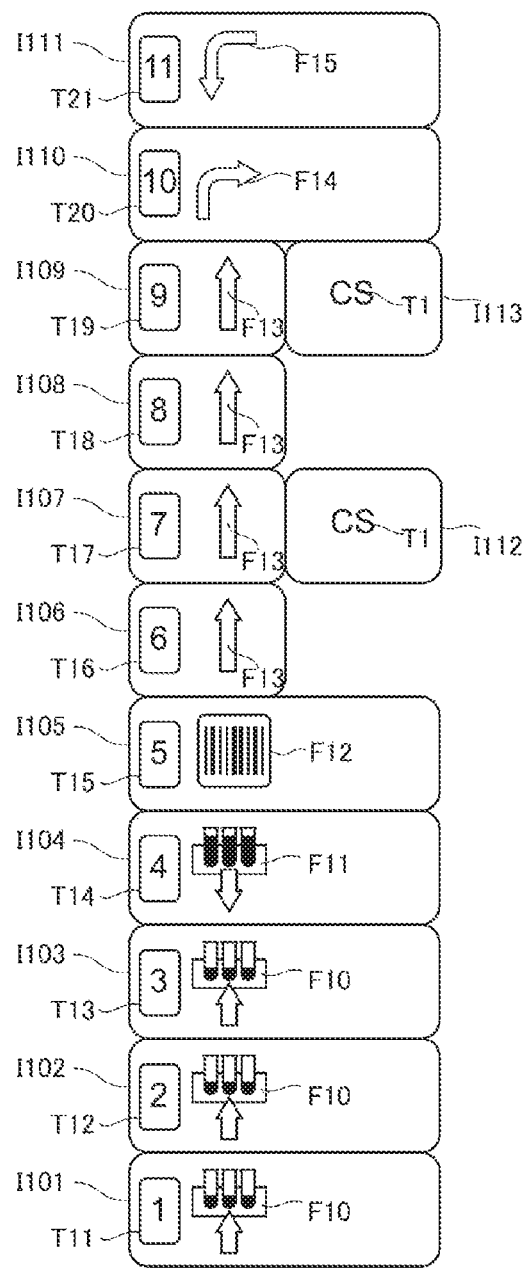

Here, in the display direction designation area A120, the display direction is not limited to "forward" and "backward", inasmuch as a more detailed display direction also may be designated. For example, the user also may specify "left direction" or "right direction" as the direction in which the user views the sample measurement system 1. FIG. 9A shows a display example of the device status display area A110 when the left side direction is designated. FIG. 9B shows a display example of the device status display area A110 when the right side direction is designated.

An arbitrary direction also may be designated as a direction in which the user looks at the sample measurement system 1 based on a predetermined direction (for example, a front direction). In this case, among all the icons indicating each of the plurality of units, the display control unit 101 may determine a part excluding an object displayed in the same direction regardless of the display direction, such that an image indicating the arrangement of a plurality of units in the sample measurement system 1 may be generated by rotating the center of the entire icon at the specified angle and drawing an object displayed in the same direction regardless of the display direction at a predetermined position of each rotated icon.

For example, the direction can be specified by specifying an angle in a clockwise direction with the front direction (the direction in which the sample measurement system 1 is viewed from the front side) being 0 degrees. When the user specifies 90 degrees (that is, the same as the left side direction), the image shown in FIG. 9B is displayed in the device status display area A110. When the user specifies 270 degrees (that is, the same as the right side direction), the image shown in FIG. 9A is displayed in the device status display area A110. The description will continue returning to FIG. 6.

In step S13, the operation receiving unit 102 determines whether the storage information button B101 has been pressed in the display menu selection area A100. When the storage information button B101 has been pressed, the process proceeds to step S14, whereas when the storage information button B101 has not been pressed, the process returns to step S11.

Figure 10:
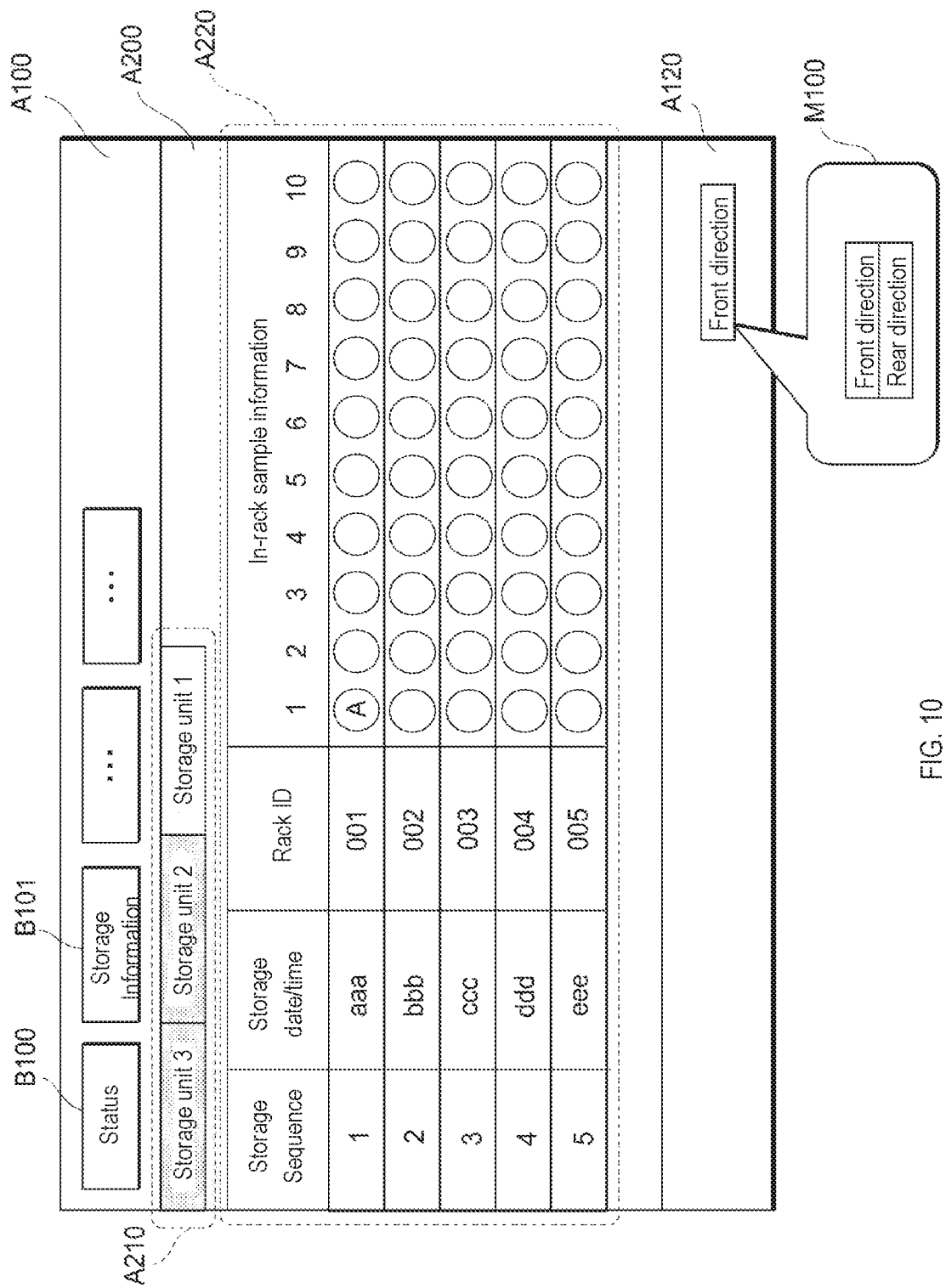
FIG. 10 is a diagram showing an example of a storage information screen.

In step S14, the display control unit 101 displays a storage information screen. FIG. 10 shows an example of the storage information screen. The storage information screen includes a display menu selection area A100, a storage unit detail display area A200, and a display direction designation area A120. In the display direction designation area A120, a pull-down menu M100 for receiving an instruction (information) regarding the display direction of the storage unit 30, the sample rack L, and the arrangement of the sample to be displayed in the storage unit detail display area A200 is displayed. The example of FIG. 10 shows a display example when the user has designated "forward" in the display direction designation area A120.

Note that the designation of the display direction in the display direction designation area A120 on the storage information screen also may track the display direction designated in the display direction designation area A120 on the device status screen. That is, when the display status is changed to the storage information screen in a state where "backward" is specified on the device status screen, the display control unit 101 may display the storage information screen in a state in which "backward" is specified.

The storage unit detail display area A200 includes a storage unit selection area A210 and a sample rack arrangement display area A220. A tab for selecting the storage unit 30 for which the arrangement of the sample rack L is desired is displayed in the storage unit selection area A210. In the example of FIG. 10, the storage units 1, 2, and 3 are displayed in the arrangement order when the user views the sample measurement system 1 from the front (from the front side). The storage unit 1 corresponds to the rightmost storage unit 30 in FIG. 1. The storage unit 2 corresponds to the next storage unit 30 on the left of the rightmost storage unit 30 in FIG. 1. The accommodation unit 3 corresponds to the next storage unit 30 on the left of the rightmost storage unit 30 in FIG. 1.

The sample rack arrangement display area A220 displays an arrangement of a plurality of sample racks L in the unit, that is, displays an image in which identifiers indicating each of the plurality of sample racks L correspond to the arrangement of the plurality of sample racks L in the unit according to the display direction. Note that the identifier indicating each of the plurality of racks is a number indicating the order in which each of the plurality of sample racks L is stored in the storage unit 30. More specifically, the display control unit 101 displays an image in which a plurality of sample racks L are arranged from the bottom in the ascending order (number), or image in which a plurality of sample racks L are arranged from the top in the ascending order (number). In the sample rack arrangement display area A220, a "storage order" indicating the order in which the sample racks L are stored, a "storage date and time" indicating the date and time of storage, and information on each sample held by the sample rack L are displayed. The "in-rack sample information" displays an image in which numbers indicating sample holding positions in the sample rack L are arranged according to the arrangement of the plurality of sample containers.

Figure 3:
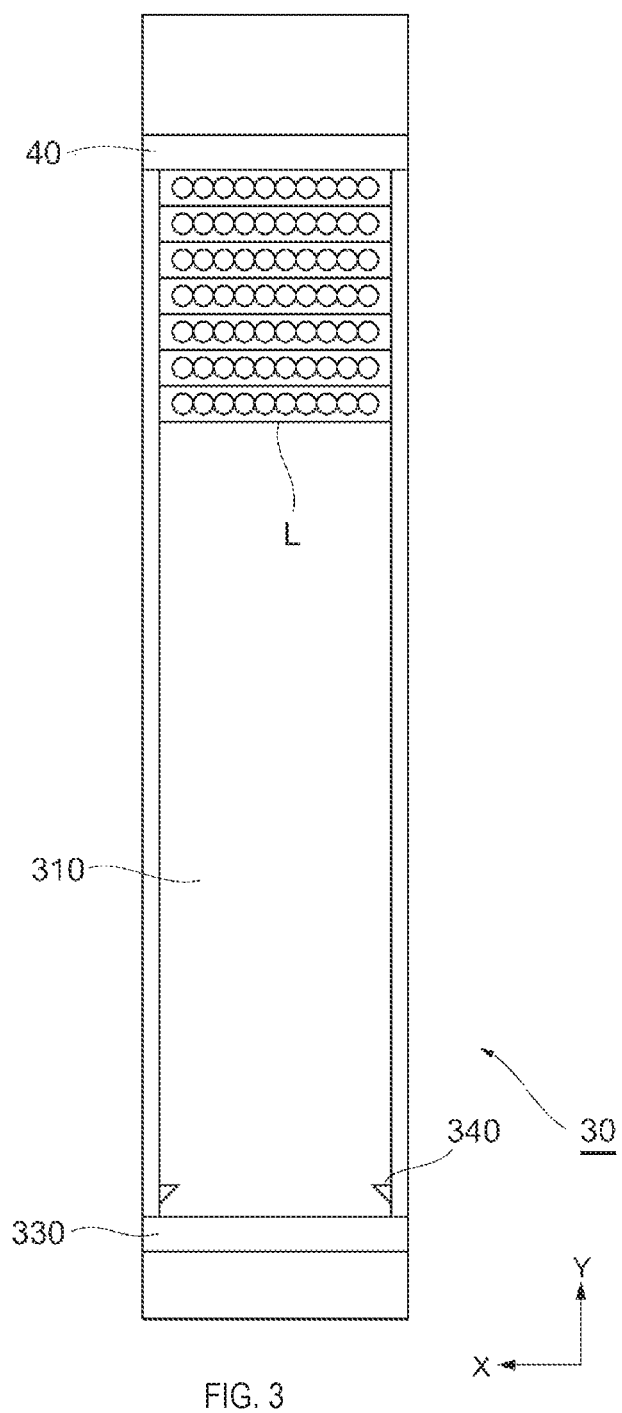
FIG. 3 is a plan view showing a structural example of a storage unit.

Here, as shown in FIG. 3, the sample racks L, for which testing is completed, move in the Y-axis positive direction from the loading unit 330 and are packed and stored in order from the transport path 40 side in the storage unit 30. Accordingly, when "forward" is designated in the display direction designation area A120, an image in which a plurality of sample racks L are arranged in ascending order from the top is displayed in the sample rack arrangement display area A220 as shown in FIG. 10.

As shown in FIGS. 2A and 2B, the numbers indicating the holding positions of the sample containers in the sample rack L also are sequentially assigned in the negative direction of the X-axis. Therefore, when "forward" is designated in the display direction designation area A120, the number indicating the holding position of the sample container on the left side is the first number of the in-rack sample information of the sample rack arrangement display area A220, as shown in FIG. 10. Note that the display control unit 101 also may display information about the sample at the holding position of the sample container. In the example of FIG. 10, the status "A" is displayed for the sample at holding position 1 in the sample rack L in the storage order 1.

Figure 11:
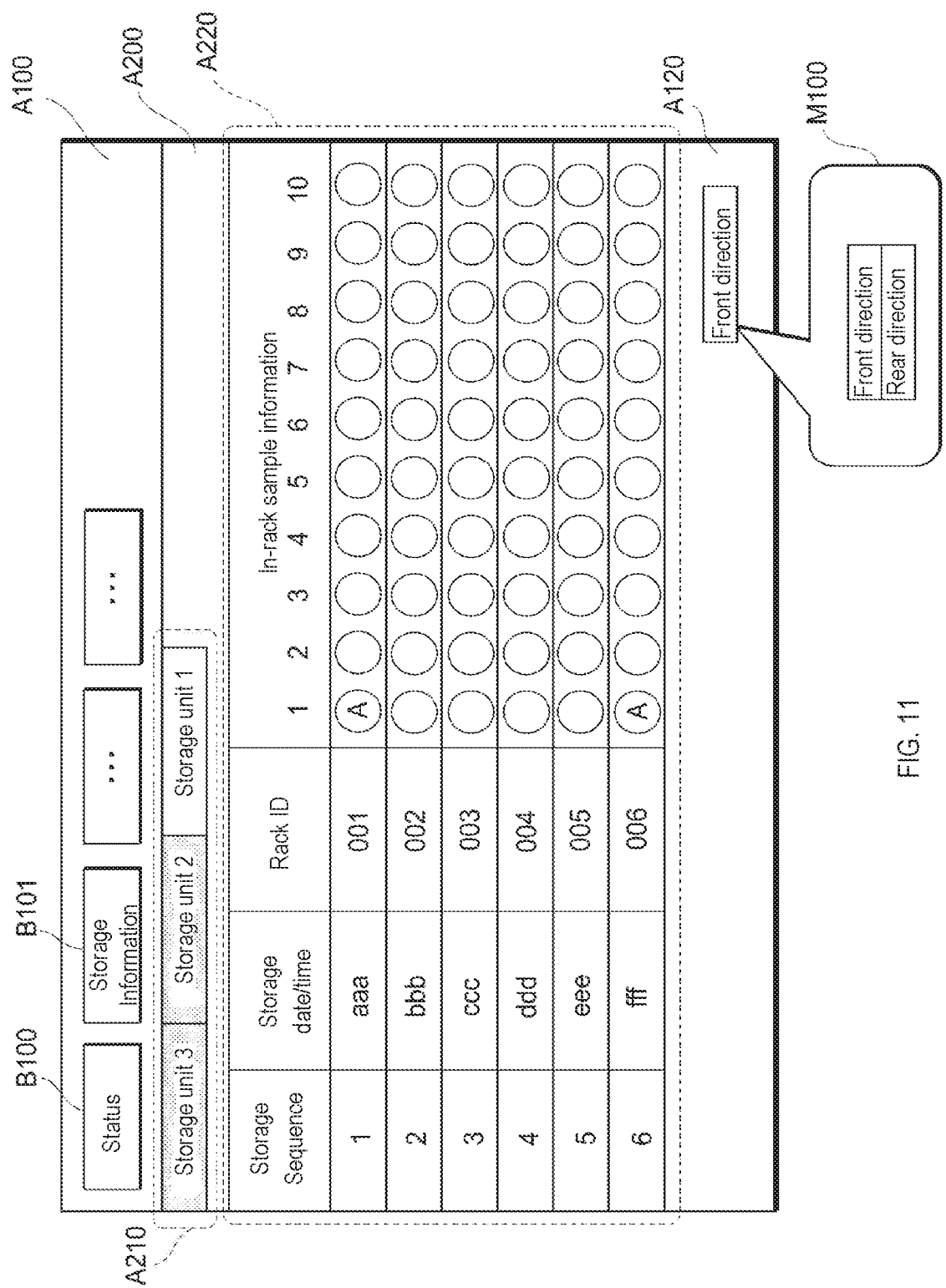
FIG. 11 is a diagram showing an example of a storage information screen.

FIG. 11 shows a display example of a new sample rack L stored in the storage unit 30 in which five sample racks L have been stored and "forward" has been designated in the display direction designation area A120. As shown in FIG. 11, information on the new sample rack L (storage date and time, rack ID) and information on the sample held by the sample rack L are added at the position of the storage order 6 (at the bottom of the screen). The description will continue returning to FIG. 6.

In step S15, the operation receiving unit 102 determines whether an instruction to change the display direction has been received by operating the menu M100. When an instruction for change has been received, the process returns to step S14, and when no instruction has been received, the process proceeds to step S16.

Figure 12:
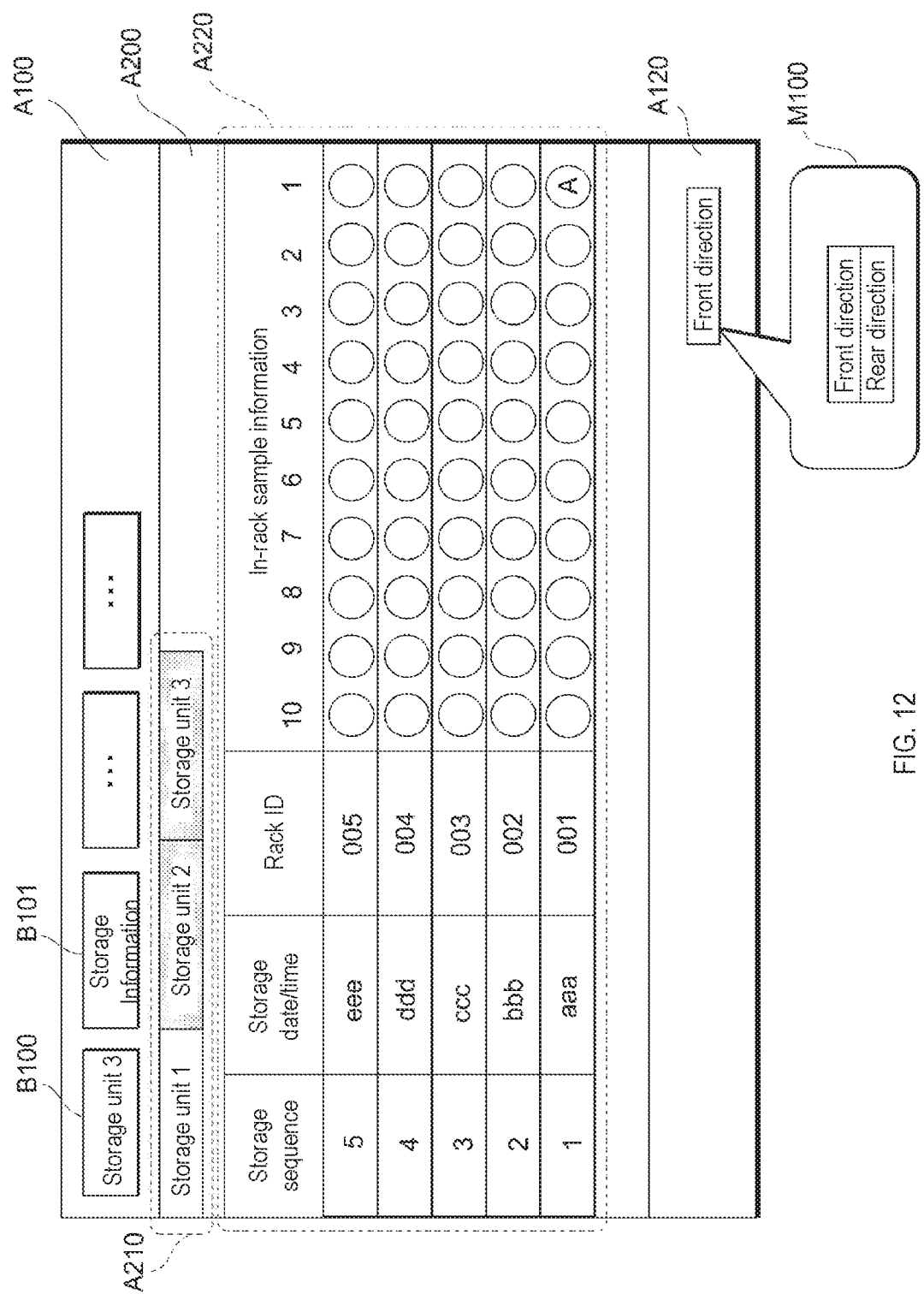
FIG. 12 is a diagram showing an example of a storage information screen.

FIG. 12 shows a display example in a case where the user designates "backward" in the display direction designation area A120. As shown in FIG. 12, the display control unit 101 displays an image in which a plurality of sample racks L are arranged in ascending order from the bottom in the sample rack arrangement display area A220. In the sample information in the rack, the numbers indicating the holding positions of the sample containers are sequentially displayed with the right side being the first. In the storage unit selection area A210, the storage unit 1, the storage unit 2, and the storage unit 3 are displayed in the arrangement order when the user views the sample measurement system 1 from the rear side.

Figure 13:
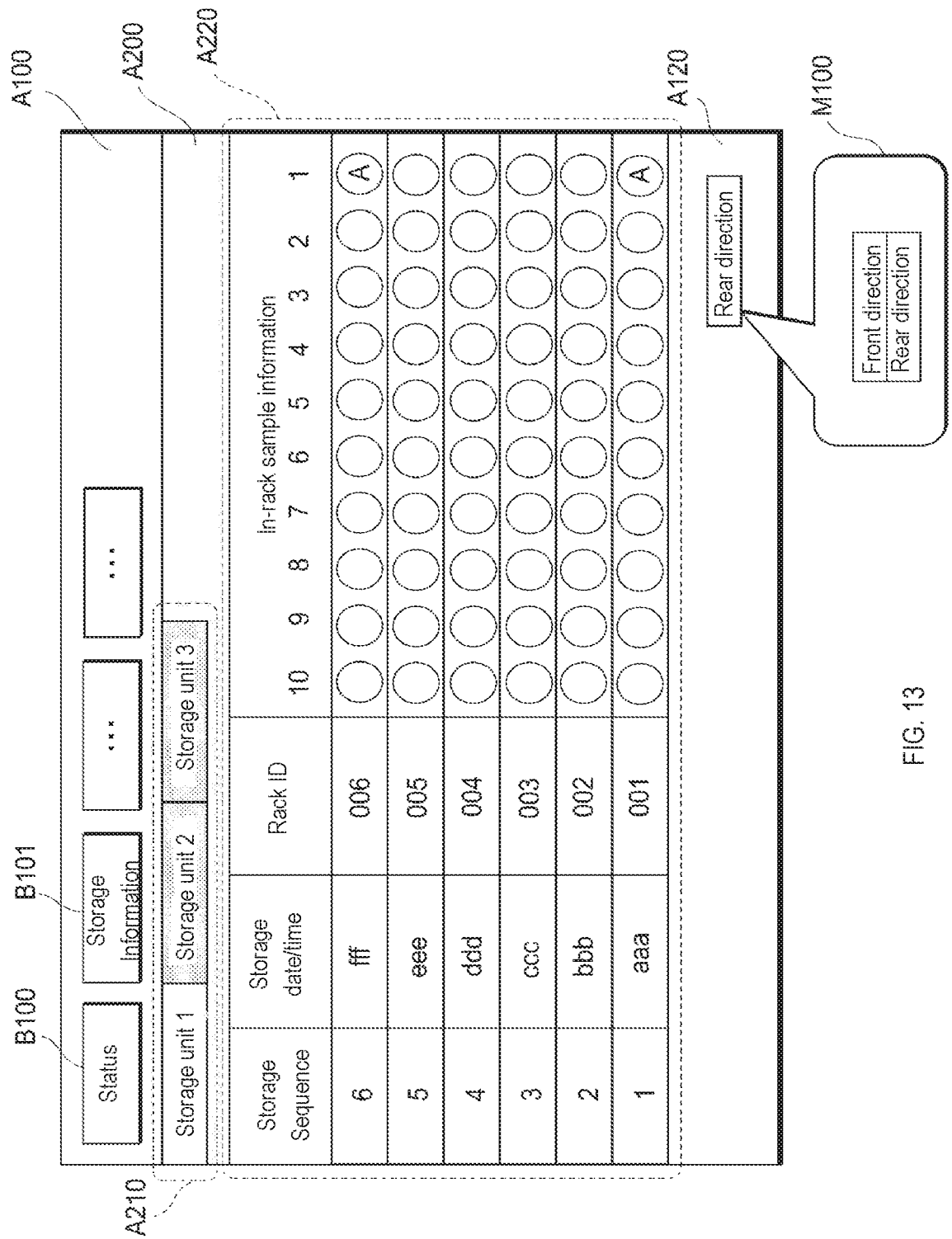
FIG. 13 is a diagram showing an example of a storage information screen.

FIG. 13 shows a display example in which a new sample rack L is stored in the storage unit 30 when five sample racks L have been stored in the storage unit 30 and "backward" is designated in the display direction designation area A120. As shown in FIG. 13, information on the new sample rack L (storage date and time, rack ID) and information on the sample held by the sample rack L are added at the position of the storage order 6 (at the upper side of the screen). The description will continue returning to FIG. 6.

In step S16, the operation receiving unit 102 determines whether the status button B100 has been pressed in the display menu selection area A100. When the status button B100 has been pressed, the process proceeds to step S12, and when the status button B100 has not been pressed, the process proceeds to step S17.

In step S17, the operation receiving unit 102 determines whether operation of the transport controller 6 has been performed. When the end operation has been performed, the process ends, whereas when the operation has not been performed, the process proceeds to step S14.

Here, when any sample rack L is selected in the sample rack arrangement display area A220 in the screens of FIGS. 10 to 13, the display control unit 101 displays the sample detail information screen showing detailed information relating to the selected sample rack L.

Figure 14:
FIG. 14 is a diagram showing an example of a sample detail screen.

FIGS. 14 and 15 show examples of the sample detail screen. On the sample detail screen, an image is displayed in which the arrangement of a plurality of sample containers in the sample rack L and the numbers indicating the sample holding positions in the sample rack L are arranged according to the arrangement of the sample containers. FIG. 14 is a display example of the sample detail screen when the screen transitions from FIGS. 10 and 11 to the sample detail screen; FIG. 15 is a display example of the sample detail screen when the screen changes from FIGS. 13 and 14 to the sample details screen. That is, when displaying the sample detail screen, the display control unit 101 follows the designation of the display direction designated on the screen of the transition source.

For example, in the sample detailed screen shown in FIG. 14, the measurement results of the samples at positions 1, 2, 3, 8, and 9 are not obtained due to the occurrence of an error, and the user must remove the sample from the storage unit 30 and perform the measurement again. The samples at positions 7 and 10 have measurement results but also must be re-measured, and the user needs to remove these samples from the storage unit 30 to be re-measured. The user browses the sample rack arrangement display shown in FIGS. 10 and 11 to specify where these samples are located in the storage unit 30. In the present embodiment at this time, the arrangement of the sample containers on the storage unit 30 that are visible to the user matches the arrangement of the sample containers displayed on the display unit 509, so that the user can easily select the samples that need to be removed.

Abnormal Operation Examples

Next, an operation example when an abnormality occurs in the barcode reading unit 32 will be described. As described above, the transport controller 6 transmits the rack ID and the sample ID of the sample rack L read by the barcode reading unit 32 to the host computer 8 to make a query about the measurement order. Here, for example, when a situation in which the measurement order that is not registered in the host computer 8 is detected, it is necessary to stop the transport of the sample rack L and prompt the user to remove the sample rack L from the barcode reading unit 32. In this case, the display control unit 101 prompts the user to respond by displaying the abnormality detection screen illustrated in FIG. 16 or FIG. 17.

Figure 16:
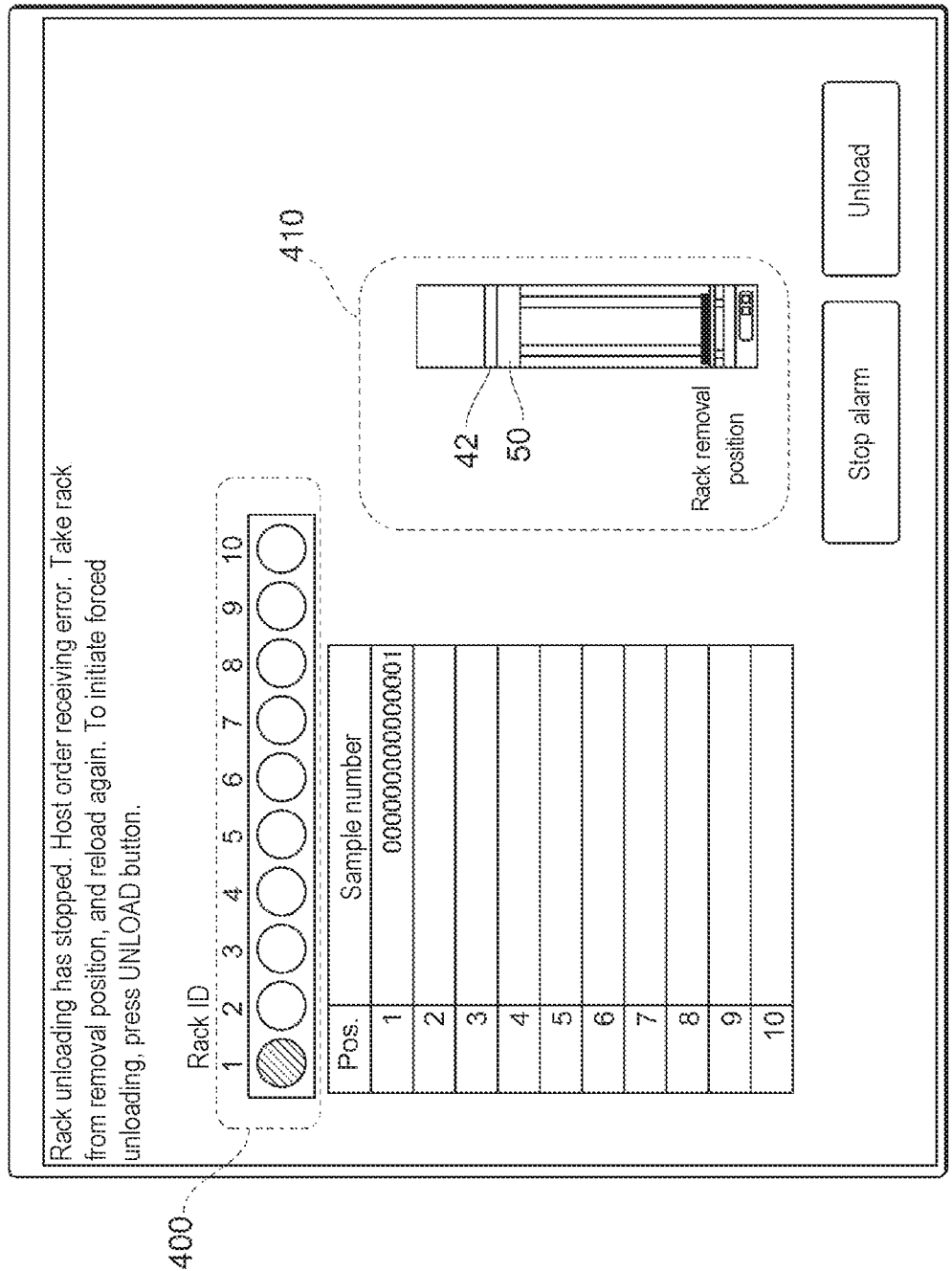
FIG. 16 is a diagram showing an example of a screen displayed when an abnormality occurs.
Figure 17:
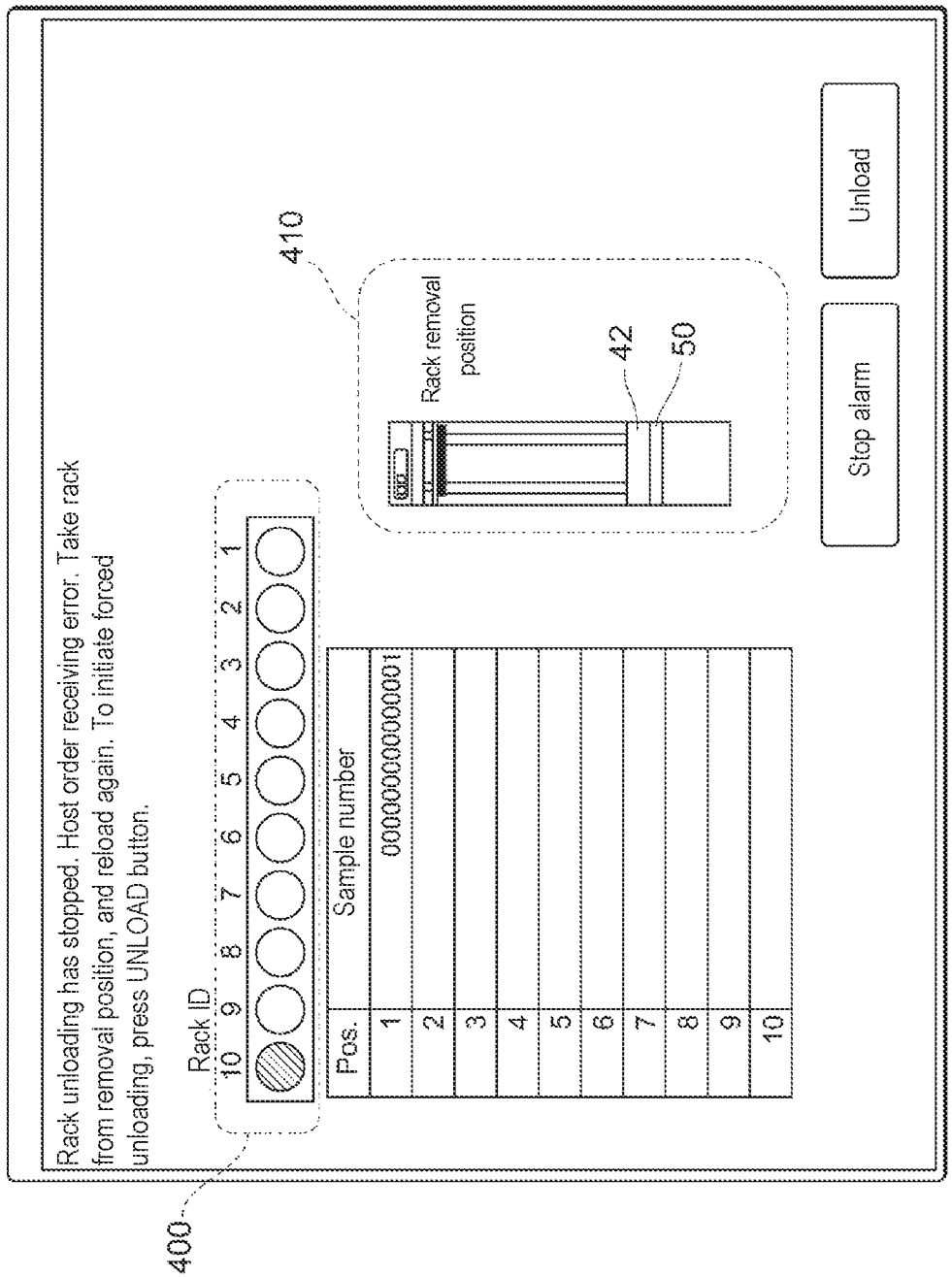
FIG. 17 is a diagram showing an example of a screen displayed when an abnormality occurs.

FIGS. 16 and 17 show examples of a screen displayed when an abnormality occurs in the barcode reading unit 32. The sample rack display area 400 displays an image in which the numbers indicating the sample holding positions in the sample rack L are arranged in the designated display direction according to the arrangement of the sample containers. In the sample rack position display area 410, an image indicating the position at which the sample rack L to be removed exists is displayed according to the specified display direction.

When displaying the abnormality detection screen, the display control unit 101 tracks the orientation of the display direction designated on the transition source screen. Therefore, the display control unit 101 displays the abnormality detection screen shown in FIG. 16 when transitioning to the abnormality detection screen while displaying FIG. 7, FIG. 10, FIG. 11, or FIG. 14. When the display control unit 101 transitions to the abnormality detection screen while displaying FIG. 8, FIG. 12, FIG. 13, or FIG. 15, the display control unit 101 displays the abnormality detection screen shown in FIG. 17.

SUMMARY

According to the embodiment described above, when displaying the arrangement of the display objects on the screen, the display objects are displayed in the display direction specified by the user without changing the arrangement order or the arrangement pattern of the display objects. In this way it possible to change the display direction of the arrangement to be displayed according to the usage mode when displaying the location of the display target according to the mode of use.

The embodiments described above are intended to facilitate understanding of the present invention, and are not intended to limit interpretation of the present invention. The flowcharts and sequences described in the embodiment, the components included in the embodiment, and the arrangement, material, condition, shape, size, and the like of the embodiment are not limited to those described and can be appropriately changed. It is also possible to partially replace or combine the configurations shown in different embodiments.

In the embodiment described above, the display unit 509 is connected to the structural units of the sample measurement system 1 by wire, although a portable computer capable of wireless communication also may be used as the display unit 509. For example, a display device (for example, a tablet terminal or the like) including at least the display unit 509 and a receiver of a global positioning system (GPS) may specify the position or direction of the display device based on radio waves from GPS satellites to specify the position or direction, and the display direction of the arrangement of the predetermined part of the sample measurement system 1 also may be changed based on the position or the direction. The display device also may be connected to the transport controller 6 by wireless communication, for example, and may have a function related to screen display among various functions of the transport controller 6.

Figure 18:
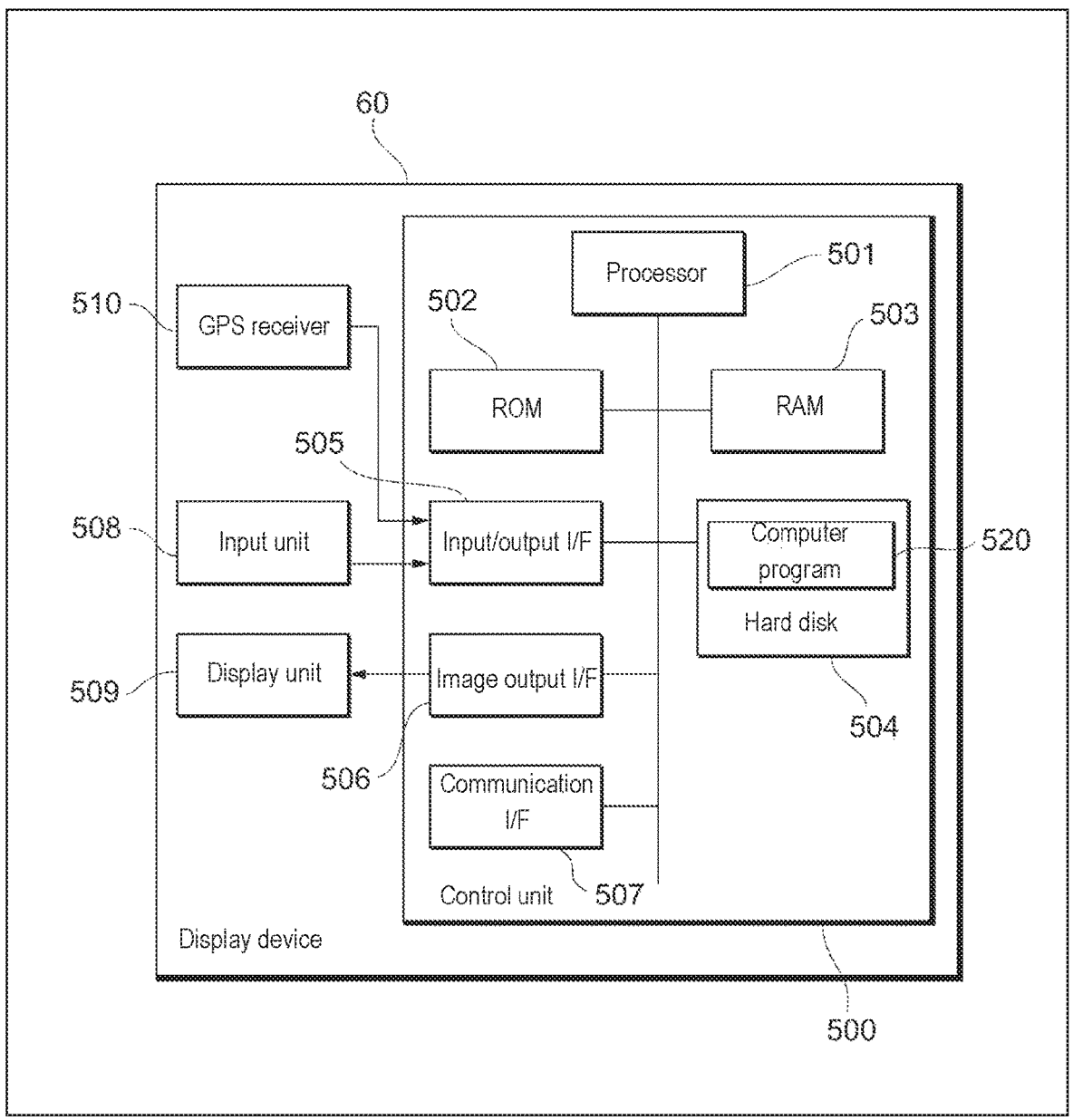
FIG. 18 is a diagram showing an example of hardware structure of a display device.
Figure 19:
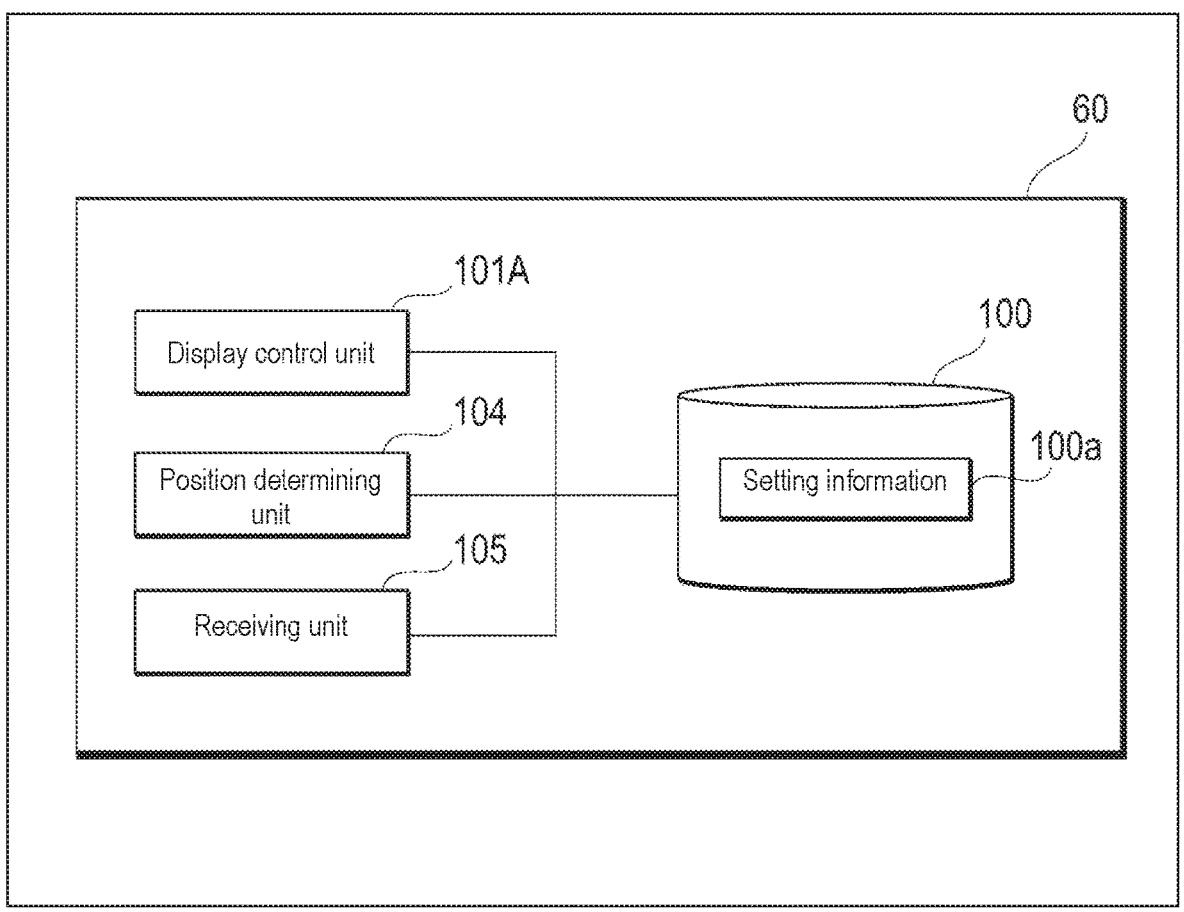
FIG. 19 is a diagram showing an example of a function structure of a display device.

FIG. 18 shows a hardware configuration example of the display device in this case. The display device 60 is configured by a computer, and includes a control unit 500, an input unit 508, and a display unit 509. The control unit 500 includes a processor 501, a ROM 502, a RAM 503, a hard disk 504 serving as a storage unit, an input/output interface 505, an image output interface 506, a communication interface 507, and a GPS receiver 510. FIG. 19 shows a functional structural example of the display device 60. The display device 60 includes a storage unit 100 for storing the setting information 100a, a display control unit 101A, a position determining unit 104, and a receiving unit 105. The position determining unit 104 determines the position or the direction of the display device 60 (that is, the display unit 509). The receiving unit 105 receives information on the position or direction of the display device 60 determined by the position determining unit 104. The display control unit 101A changes the display direction of the arrangement of the predetermined part to be displayed on the display unit 509 according to the information regarding the position or direction of the display device 60.

Figure 20:
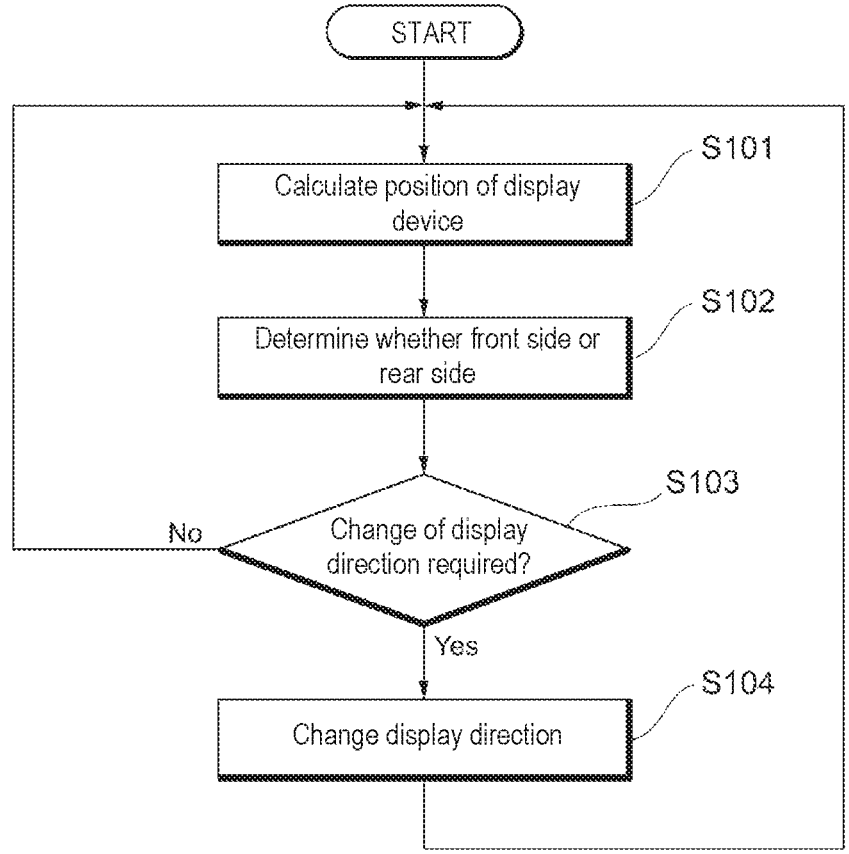
FIG. 20 is a flowchart showing an example of a processing procedure performed by the display device.

FIG. 20 is a flowchart describing an example of a processing procedure performed by the display device 60. In step S101, the position determining unit 104 calculates the position of the display device 60 based on the radio waves received by the GPS receiver 510. In step S102, the position determining unit 104 determines whether the display device 60 is located on the front side or the rear side of the sample measurement system 1 based on the calculated position. This determination information is received by the receiving unit 105. Note that the range information on the front side and the range information on the rear side are stored in the storage unit 100 in advance. In step S103, the display control unit 101A determines whether the display direction must be changed based on whether the determination information received by the receiving unit 105 (information indicating whether the sample measurement system 1 is on the front side or the rear side) matches the display direction of the arrangement of the predetermined part of the sample measurement system displayed at that time. For example, when the determination information received by the receiving unit 105 is information indicating that the display device 60 is located on the front side of the sample measurement system 1 and the current display direction is forward, it is determined that there is no need to change the display direction. On the other hand, when the determination information 4 received by the receiving unit 105 is information indicating that the display device 60 is located on the rear side of the sample measurement system 1 and the current display direction is forward, it is determined that the display direction must be changed. If the display control unit 101A determines that the display direction must be changed (step S103: YES), the display control unit 101A changes the display direction in step S104, and returns the processing to step S101. If the display control unit 101A determines that the display direction does not need to be changed (step S103: NO), the display control unit 101A returns the process to step S101 without changing the display direction. The display control unit 101A repeatedly performs the processing of the flowchart described in FIG. 20 until the display of the arrangement of the predetermined part in the sample measurement system 1 is completed.

What is claimed is:

1. A display device that displays information about a sample measurement system that transports a rack holding a sample container and measures a sample in the sample container, comprising:
    a display;
    a processor coupled to the display and configured to:
        cause the display to display an image indicating an arrangement of predetermined elements within the sample measurement system and an arrangement of the rack transported by the sample measurement system;
        receive information about a display direction; and
        change a display direction of the arrangement of the predetermined elements and the arrangement of the rack according to the information.

2. The display device according to claim 1, wherein
    the sample measurement system comprises the rack capable of holding a plurality of sample containers, and a plurality of units configured to load, transport, and collect a plurality of racks;
    the arrangement of the predetermined elements includes at least one of an arrangement of the plurality of units, an arrangement of the plurality of racks in the unit, and an arrangement of the plurality of sample containers in the rack.

3. The display device according to claim 2, wherein
    the arrangement of the predetermined elements is an arrangement of the plurality of units; and
    the processor is configured to cause the display to display an image in which icons indicating the plurality of units are arranged according to the arrangement of the plurality of units.

4. The display device according to claim 3, wherein
    the icons indicating each of the plurality of units have at least one of graphical object displayed in a constant angle regardless of the display direction, and graphical object which is displayed in an angle corresponding to the display direction is displayed.

5. The display device according to claim 4, wherein
    the graphical object displayed in a constant angle regardless of the display direction is a character or an object indicating a function of each of the plurality of units; and
    the graphical object which is displayed in an angle corresponding to the display direction is an object indicating a rack transport direction.

6. The display device according to claim 2, wherein
    the arrangement of the predetermined elements is an arrangement of the plurality of racks in a unit; and
    the processor is configured to cause the display to display an image in which identifiers representing each of the plurality of racks are arranged in alignment with the arrangement of the plurality of racks in a unit according to the display direction.

7. The display device according to claim 6, wherein
    the identifier indicating each of the plurality of racks is a number indicating an order in which each of the plurality of racks is accommodated in the unit; and
    the processor is configured to cause the display to display an image in which the plurality of racks are arranged from the bottom in an ascending order of numbers, or an image in which the plurality of racks are arranged from the top in ascending order of numbers according to the display direction.

8. The display device according to claim 2, wherein
    the arrangement of the predetermined elements is an arrangement of the plurality of sample containers in a rack; and
    the processor is configured to cause the display to display an image in which identifiers indicating locations where the sample containers are stored in the rack are arranged according to the arrangement of the plurality of sample containers.

9. The display device according to claim 1, wherein
    the processor is configured to receive the information relating to the display direction by receiving a selection of one instruction item from a plurality of preset instruction items.

10. The display control unit according to claim 1, wherein
    the processor is configured to cause the display to display a screen for receiving an instruction regarding the display direction in an image indicating an arrangement of a predetermined elements within the sample measurement system or in a setting screen.

11. The display device according to claim 1, wherein
    information about the display direction is associated with a direction in which the display is oriented; and
    the processor is configured to cause the display to display the arrangement of the predetermined elements so as to be the same as the actual arrangement when the user views the sample measurement system.

12. The display device according to claim 1, further comprising:
    a plurality of displays;
    wherein the processor is configured to:
        receive information on a display direction for each of the display; and cause each of the displays to display an image in which an arrangement of the predetermined elements and the arrangement of the rack is changed according to a display direction of the received information.

13. The display device according to claim 1, wherein
the information relating to the display is information concerning a position or a direction of the display;
the processor is configured to change a display direction of the arrangement of the predetermined elements and the arrangement of the rack according to information concerning a position or a direction of the display.

14. A sample measurement system comprising:
a sample processing apparatus for processing a sample;
a transport device for loading a rack capable of holding a plurality of sample containers, transporting the sample containers to the sample processing apparatus, and including a plurality of units for transport and collection; and
a computer having a display and an input interface connected to the transport device via a communication network;
wherein the computer is configured to:
cause the display to display an image indicating an arrangement of a predetermined elements within the sample measurement system including an arrangement of the plurality of units and an arrangement of the plurality of racks; and
receive information about a display direction via the input interface; and,
change a display direction of the arrangement of the plurality of units and the arrangement of the plurality of racks according to the information.

15. A computer implemented method for a sample measurement system that measures a sample, the method comprising:
receiving information about a display direction; and
displaying an image indicating an arrangement of a predetermined elements within the sample measurement system and an arrangement of a rack transported by the sample measurement system according to the display direction of the received information.

16. The method according to claim 15, wherein
the arrangement of the predetermined elements includes at least one of an arrangement of a plurality of units, an arrangement of a plurality of racks in the unit, and an arrangement of a plurality of sample containers in the rack.

17. The method according to claim 15, wherein
the arrangement of the predetermined elements comprises an arrangement of a plurality of units; and
the image includes icons indicating the plurality of units arranged according to the arrangement of the plurality of units.

18. The method according to claim 17, wherein
the icons indicating each of the plurality of units have at least one of graphical object displayed in a constant angle regardless of the display direction, and graphical object which is displayed in an angle corresponding to the display direction is displayed.

19. The method according to claim 18, wherein
the graphical object displayed in a constant angle regardless of the display direction is a character or an object indicating a function of each of the plurality of units; and
the graphical object which is displayed in an angle corresponding to the display direction is an object indicating a rack transport direction.

20. The method according to claim 15, wherein
the arrangement of the predetermined elements is an arrangement of a plurality of racks in a unit; and
the image includes identifiers representing each of the plurality of racks arranged in alignment with the arrangement of the plurality of racks in a unit according to the display direction.

* * * * *

UNITED STATES PATENT AND TRADEMARK OFFICE
CERTIFICATE OF CORRECTION

| | |
|---|---|
| PATENT NO. | : 11,531,037 B2 |
| APPLICATION NO. | : 16/911648 |
| DATED | : December 20, 2022 |
| INVENTOR(S) | : Kumagai et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 166 days.

Signed and Sealed this
Twenty-eighth Day of January, 2025

Coke Morgan Stewart
*Acting Director of the United States Patent and Trademark Office*